United States Patent [19]
Brennan

[11] Patent Number: 6,031,848
[45] Date of Patent: Feb. 29, 2000

[54] APPARATUS FOR AN IMPROVED ISDN TERMINAL ADAPTER HAVING BAUD RATE UNBLOCKING AND METHODS FOR USE THEREIN

[75] Inventor: Daniel M. Brennan, Hillsdale, N.J.

[73] Assignee: 3Com Corporation, Santa Clara, Calif.

[21] Appl. No.: 08/852,658

[22] Filed: May 7, 1997

[51] Int. Cl.[7] .............................. H04J 3/12; H04L 12/16
[52] U.S. Cl. .......................... 370/522; 370/524; 370/264
[58] Field of Search .................................. 375/219, 220, 375/221, 222; 370/522, 524, 523, 465, 466, 467, 241, 252

[56] References Cited

U.S. PATENT DOCUMENTS

| | | | |
|---|---|---|---|
| 5,008,902 | 4/1991 | Key .......................................... | 370/465 |
| 5,315,595 | 5/1994 | Allouis .................................... | 370/524 |
| 5,490,209 | 2/1996 | Kennedy .............................. | 379/93.08 |
| 5,627,858 | 5/1997 | Mak ........................................ | 370/252 |
| 5,708,663 | 1/1998 | Wright .................................... | 370/254 |
| 5,708,778 | 1/1998 | Monot .................................... | 370/255 |
| 5,715,241 | 2/1998 | Glass ...................................... | 370/252 |
| 5,748,628 | 5/1998 | Ericson ................................... | 370/384 |
| 5,838,907 | 11/1998 | Hansen ................................. | 395/200.5 |
| 5,875,037 | 2/1999 | Murata ................................... | 358/400 |

OTHER PUBLICATIONS

U.S. application No. 08/852,659, Best et al., filed May 7, 1997.
U.S. application No. 08/852,657, Brennan et al., filed May 7, 1997.
U.S. application No. 08/852,656, Best et al., filed May 7, 1997.

*Primary Examiner*—Ajit Patel
*Assistant Examiner*—Ricardo Pizarro
*Attorney, Agent, or Firm*—Michaelson & Wallace; Peter L. Michaelson

[57] ABSTRACT

Apparatus for an improved ISDN terminal adapter (5) and accompanying methods for use therein. The adapter provides automatic ISDN switch detection, automatic SPID configuration, baud rate unblocking and automatic data compression. Specifically, with respect to baud rate unblocking, the adapter detects instances of baud rate blocking, through excessive communication errors for a known input, and forces the adapter to relinquish its high speed setting and automatically return to autobaud operation but at a lower maximum speed.

25 Claims, 18 Drawing Sheets

| GENERAL SPID FORMAT 410 | PREFIX | DIRECTORY NUMBER (7 OR 10 DIGIT) | SUFFIX |
|---|---|---|---|
| SPECIFIC SPID FORMATS 420 | 01 | 5301234 | 000 |
|  | 10 | 5301234 | 000 |
|  | 01 | 5301234 | 001 |

FIG. 4A  SPID FORMATS

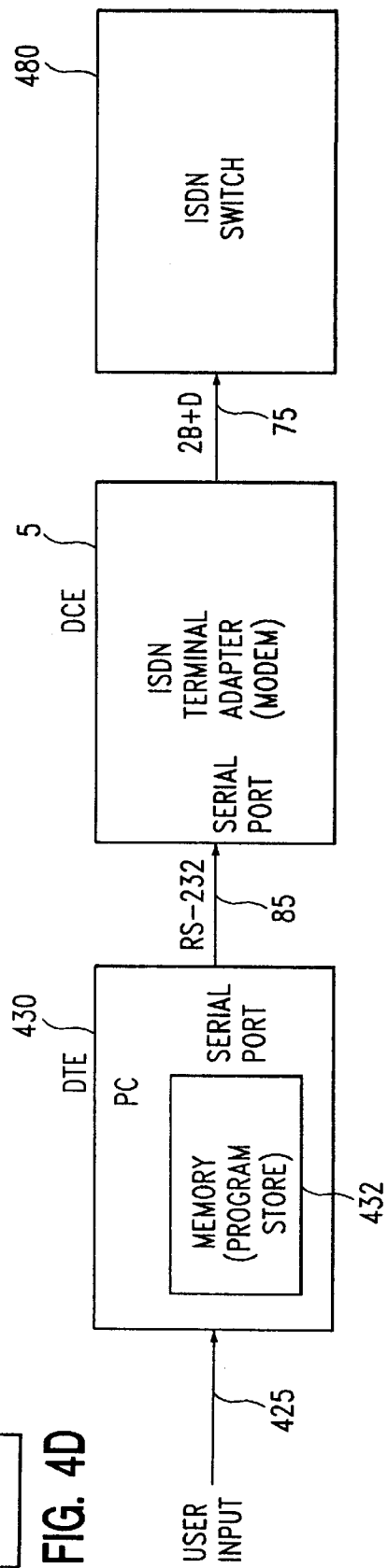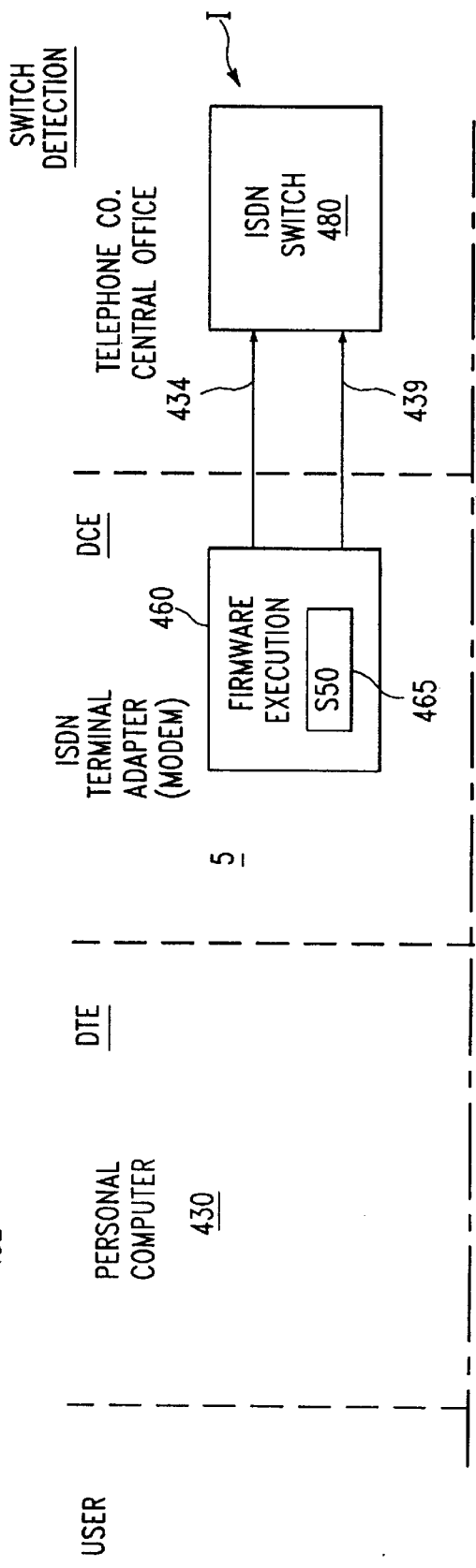

SWITCH DETECT ROUTINE 600

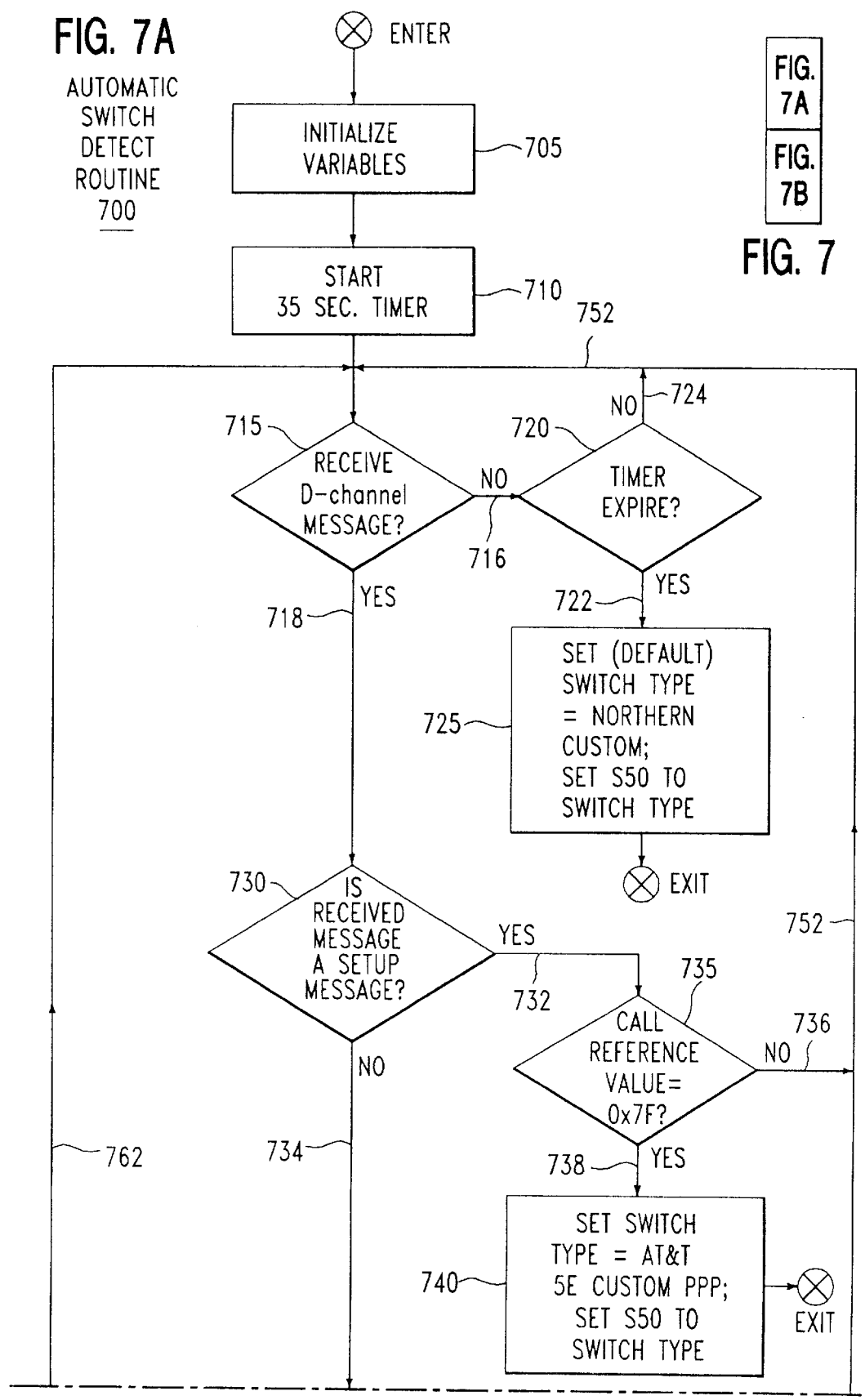

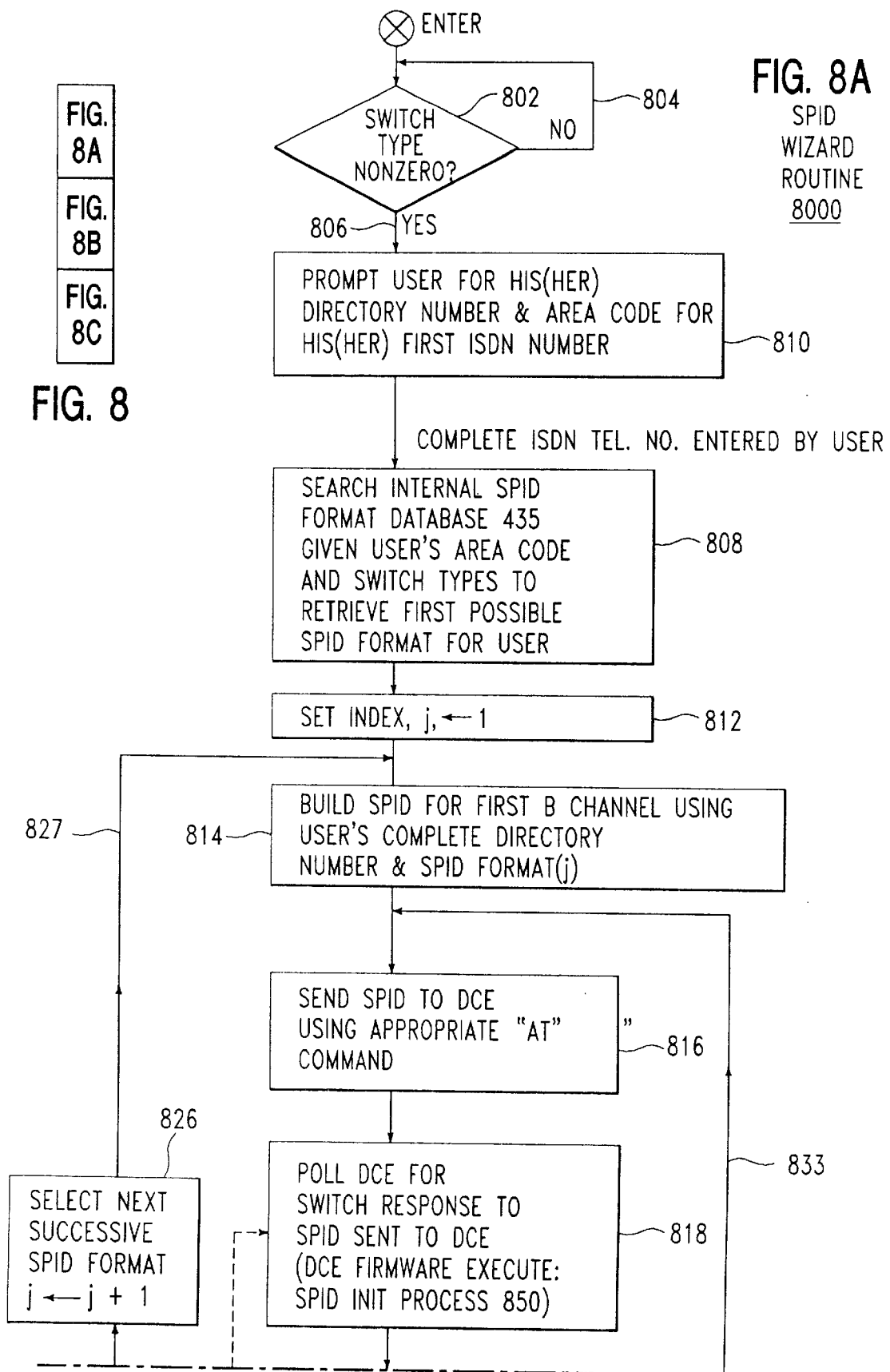

BAUD RATE UNBLOCKING PROCESS 900

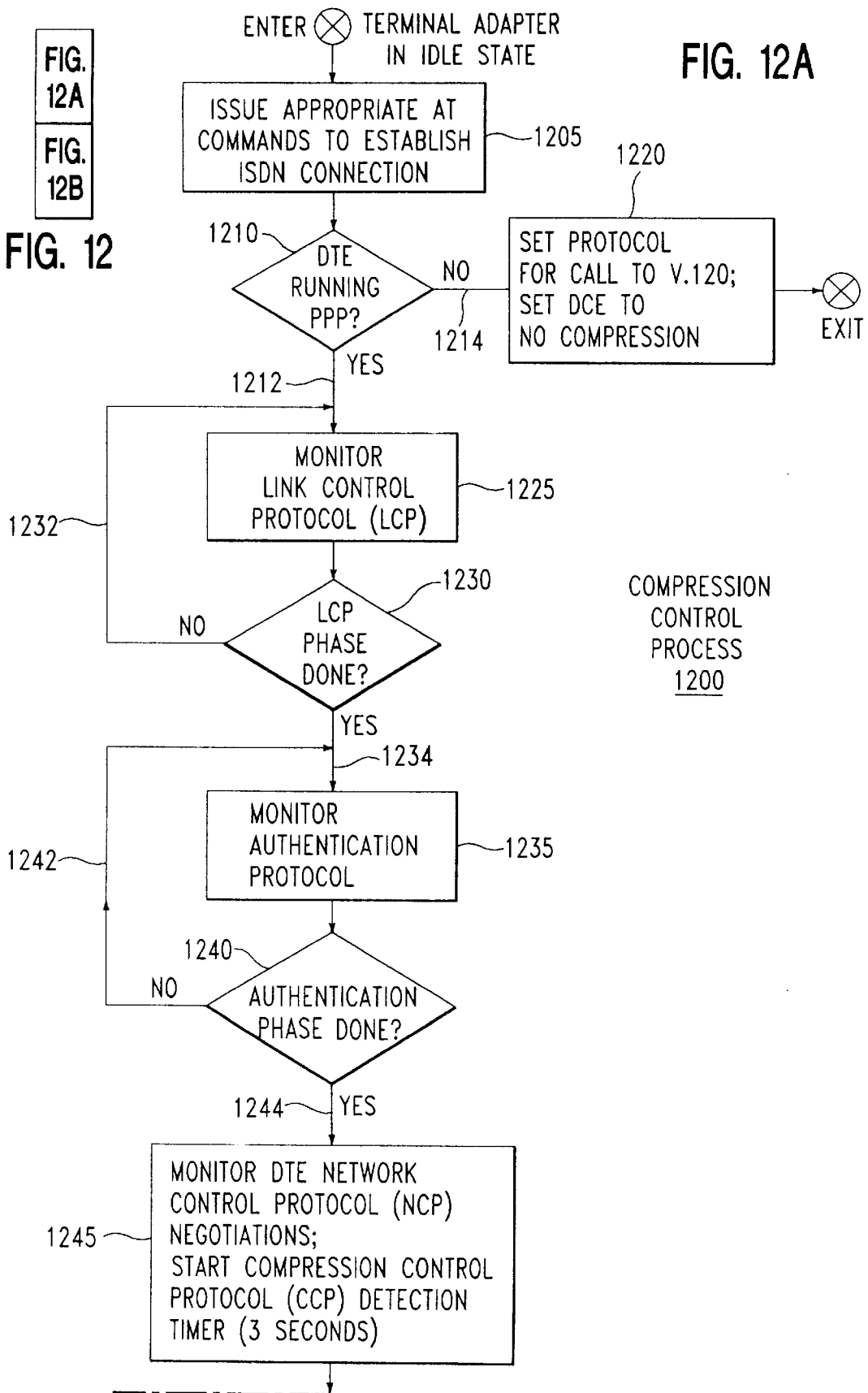

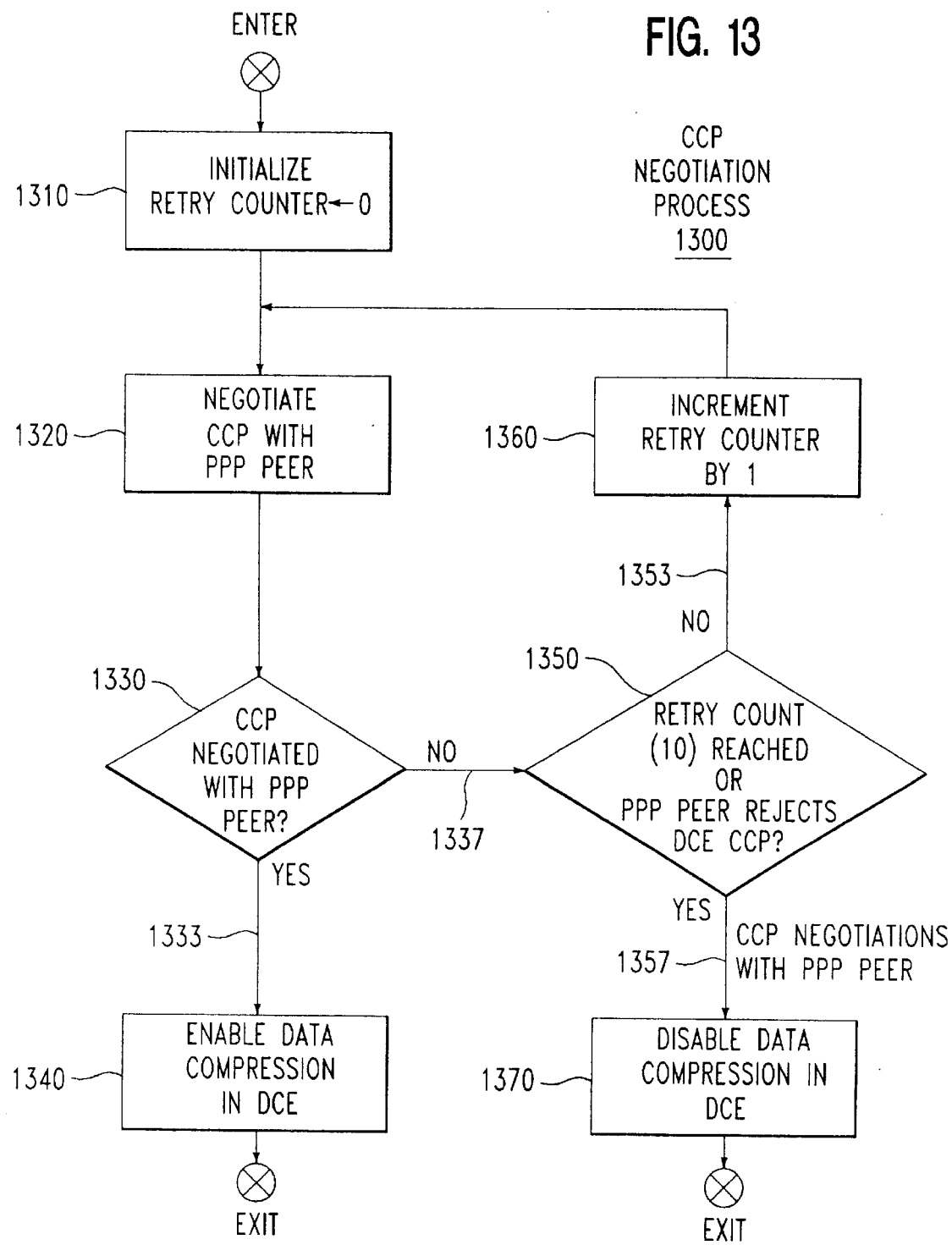

APPARATUS FOR AN IMPROVED ISDN TERMINAL ADAPTER HAVING BAUD RATE UNBLOCKING AND METHODS FOR USE THEREIN

BACKGROUND OF THE DISCLOSURE

1. Field of the Invention

The invention relates to apparatus for an improved ISDN terminal adapter, commonly and loosely referred to as an "ISDN modem", and accompanying methods for use therein. Specifically, to simplify and facilitate installation and provide economical use, the inventive terminal adapter provides automatic ISDN switch detection, automatic SPID (service profile identification) configuration, baud rate unblocking and automatic data compression.

2. Description of the Prior Art

In recent years, a number of domestic and foreign telephone companies have begun offering integrated service digital network (ISDN) services to their customers. ISDN provides an integrated voice and data network that offers both increased bandwidth and significant flexibility over traditional analog telephone services. Inasmuch as subscriber charges for ISDN access are decreasing—with the decrease being rather noticeable for some telephone companies, demand for ISDN service and equipment is rising appreciably. Demand is particularly strong and growing for those subscribers who seek cost-effective high speed access to the Internet.

In particular, a basic rate (so-called "2B+D" service) ISDN interface provides higher speed bandwidth than both traditional analog, modem-based dial-up access modalities and comparably priced switched digital services. Each so-called B ("bearer") channel, which carries subscriber voice and/or data, provides 64 Kbits/second of bandwidth; while a D ("data") channel, which carries signaling and control information, provides 16 Kbits/second of bandwidth. For the bandwidth delivered, an ISDN line is significantly less expensive than a private leased line that supplies the same bandwidth across the three channels. Furthermore, ISDN, being a digital end-to-end service, provides digital transmission channels that tend to be more accurate and reliable, from the standpoint of error rates and dropped connections, than are conventional analog connections. In addition, ISDN service provides rapid connect times which, in turn, provide faster support for those LAN (local area network) protocols that require relatively short latency across WAN (wide area network) connections.

Starting a few years ago, various networking and communications equipment manufacturers have been offering relatively inexpensive ISDN terminal adapters, more commonly and rather loosely referred to as "ISDN modems" (though these adapters do not contain a traditional analog modulator-demodulator as occurs in a conventional analog modem), for subscriber end-use. Such a terminal adapter, also generically referred to as "data circuit terminating equipment" (DCE), once connected to an ISDN connection and a serial port on a subscriber's personal computer (PC), permits that subscriber to connect his (her) computer to, e.g., an Internet service provider and communicate at speeds approximately two to four times greater than a conventional analog modem. The computer so connected becomes so-called "data terminal equipment" (DTE). While the availability of these terminal adapters is clearly not the sole cause underlying the growth in ISDN usage, it, when combined with decreasing rates for ISDN service, is certainly a large and growing factor.

Ideally, an ISDN terminal adapter should be as easy for a subscriber to install and use as is a conventional analog modem. However, in practice and for various reasons, installing a conventional ISDN terminal adapter is rather tedious, frustrating and time consuming.

First, user difficulties arise due to differences in so-called "SPID" formats across different ISDN switches. While, for the most part, ISDN service is quite uniform across the entire United States, slight differences do exist as to how this service is implemented among various telephone companies. In particular, a small number of ISDN switch manufacturers currently exist which supply such switches to telephone companies in the United States. These manufacturers currently include Northern Telecom, Ltd., Siemens Corporation and Lucent Technologies, Inc. Northern Telecom and Siemens currently offer one ISDN switch each (carrying product designations "DMS 100" and "EWSD", respectively)—each being a so-called "NI-1" type (referring to "National ISDN 1") switch and will be so referred to hereinafter. The Northern DMS 100 switch is available in two versions, i.e., an NI-1 version and a custom version—those versions differing only in their software. Lucent Technologies currently offers three different ISDN switches (a "5E Custom Multi-point", "5E NI-1" and "5E Custom Point-to-point"), though all implemented on a common 5ESS hardware platform (these switches differing in their generics, i.e., software). At present, there are implementational differences in the United States among ISDN switches currently in service; though no such differences exist in Europe. Consequently, while these switches are generally compatible with each other, idiosyncratic differences do exist among the various switches that complicate installation and use of an ISDN terminal adapter. Specifically, while each switch requires each specific DCE that is to be connected to the switch to be electronically identified by a corresponding SPID (service profile identifier) assigned to it by a local telephone company, the format of the SPID varies from one switch type to another. A SPID established for use with one type of ISDN switch will not likely function with another type of ISDN switch; thus, completely preventing any ISDN calls from being established through the latter switch. Moreover, when an ISDN line is ordered from the local telephone company, a SPID is established for that line and, then, generally, entered manually, as data, into a database on the ISDN switch at the company to provision the service.

Establishing and entering a SPID into a telephone company database is a rather laborious process, and one, for telephone company personnel, that has proven to be a recurring source of errors. Oftentimes, these errors are not detected during data entry. While installing and, specifically, configuring a conventional ISDN terminal adapter for use with an ISDN line, an ISDN subscriber must manually enter a SPID provided by his (her) telephone company for that line into the terminal adapter. During call setup, the adapter transmits its SPID to the switch in order to identify itself to the switch. A significant probability exists that this SPID will be incorrect. Hence, it is the subscriber, during installing his (her) ISDN terminal adapter, who often experiences first-hand the effect of an incorrect SPID. Since the vast majority of subscribers have no knowledge of ISDN control messages, let alone the particular type of ISDN switch to which (s) he is connected and its corresponding SPID format, many subscribers quickly discover that their ISDN terminal adapters will not function, for reasons that are not immediately apparent to or resolvable by them, and hence can become very frustrated and rather irritated. Such subscribers can and often do expend considerable time and effort in telephone conversations with customer service representatives of the local telephone company and/or their terminal adapter manufacturers in an effort to locate and cure the problem—a SPID error. As a result, conventional ISDN terminal adapters have acquired a reputation, at least in the United States and Canada, as being quite time-consuming to install and properly configure. To complicate matters, the same difficulties arise if the subscriber merely moves the ISDN terminal adapter to a different location, i.e., one served by a switch that requires a different SPID format.

Second, while conventional ISDN terminal adapters provide a so-called "autobaud" capability, baud rate "blocking" can occur which causes user difficulties. Many ISDN terminal adapters are externally connected to a personal computer through a serial port provided by the computer. Circuitry used to implement this port, specifically the UART (universal asynchronous receiver transmitter) used therein, supports a wide range of serial data speeds up to approximately 230 Kbaud/second. The speed at which a serial port will communicate is typically defined by a user who selects one of a number of speed settings provided by a serial port driver within an operating system, such as the "Window 95" or "Windows NT" operating system which is currently available from Microsoft Corporation of Redmond, Washington (which also owns the trademarks "Window 95" and "Windows NT"). For proper serial communication, both the serial port on the personal computer and the terminal adapter itself must be configured to communicate at the same speed. Generally, the serial port of the terminal adapter is set to a factory default value which permits a so-called "autobaud" operation to occur on power-up of the adapter. During autobaud operation, the terminal adapter will sample the incoming serial data stream at least six times faster than its data rate to determine the baud rate of the stream. Once the rate is determined, the terminal adapter will set its serial data rate to match that of the stream. Owing to design choices, an ISDN terminal adapter generally does not have a processor that is sufficiently powerful to sample, let alone accurately, an incoming bit stream at six times 230 Kbaud/sec (approximately 1.38 Mbaud/sec). Consequently, conventional ISDN terminal adapters only provide autobaud capability to approximately 115 Kbaud/second. Therefore, in order for a subscriber to use the 230 Kbaud/sec speed, that subscriber must first establish communication between the personal computer and the adapter at a lower speed, i.e., 115 Kbaud/sec or below, and then manually issue a well-known "AT" command from the computer to the adapter to manually set and lock the speed of the adapter at 230 Kbaud/second. The terminal adapter retains this setting within its non-volatile memory to appropriately set its speed during subsequent power-on initialization. Thereafter, the subscriber changes the speed setting in his (her) serial port communication driver to 230 Kbaud/second, hence matching that of the adapter. Serial communication can then occur between the personal computer and the terminal adapter at a maximum rate of 230 Kbaud/second. Unfortunately, a serious problem occurs if the subscriber decides to move the terminal adapter to a different computer. Since the adapter is locked to communicate at only 230 Kbaud/second and will not "autobaud", then, if the serial port driver on that computer is set to any speed other then 230 Kbaud/second or simply cannot support a speed of 230 Kbaud/sec— regardless of its setting, the terminal adapter and the computer will simply not communicate with each other; i.e., communication is "blocked" by the baud rate difference. A user of a conventional terminal adapter generally has no idea that baud rate "blocking" is occurring and hence becomes quite frustrated. Generally speaking, baud rate "blocking" can occur at any other baud rate, i.e., less than 230 Kbaud/sec, whenever the baud rate of the terminal adapter is set and locked to one speed while the serial port of the PC to which the adapter is connected is set to a different baud rate.

Therefore, a need exists in the art for an ISDN terminal adapter that significantly simplifies and expedites its installation and configuration. Preferably, such a adapter should automatically detect the type of ISDN switch to which the adapter is connected and adjust its operation to assure compatibility with that switch. In addition, such an adapter should detect when a condition of baud rate blocking likely occurs, regardless of the baud rate to which the terminal adapter is set, and automatically change its operation to terminate the condition. Advantageously, such an adapter will not only substantially eliminate a burden heretofore shouldered by an ISDN subscriber but also, by doing so, might increase the overall demand for ISDN service.

SUMMARY OF THE INVENTION

The present invention overcomes the deficiencies in the art and satisfies this need by providing an ISDN terminal adapter which provides automatic ISDN switch detection, automatic SPID (service profile identification) configuration, baud rate unblocking and automatic data compression.

In accordance with our invention and as to automatic switch detection and SPID configuration, our inventive terminal adapter automatically detects the switch type by analyzing D-channel ISDN initialization messages received from the switch as well as, where appropriate, responses, in terms of D-channel ISDN messages, received from the switch to specific ISDN messages sent by the adapter, and sets the switch type accordingly. The switch type value is then used, during SPID determination, in conjunction with the directory telephone number of the user, to access an internal database, specifically a table, of predefined SPID formats, referenced in terms of particular telephone service areas and switch types, to access the possible SPID format (s) for the ISDN switch to which the adapter is likely connected.

Our inventive terminal adapter forms a SPID through interaction among the user; the DTE, such as a personal computer (PC); the terminal adapter and the ISDN switch. In essence, firmware executing within the terminal adapter, in conjunction with software executing within the PC, forms one of more SPID (s) appropriate for the ISDN switch to which the adapter is connected, queries the switch with each of these SPIDs to select and verify a correct SPID from those formed, and, if necessary, further refines and updates the switch type previously determined.

Furthermore, with respect to baud rate unblocking, our inventive terminal adapter detects instances of baud rate mismatch, through excessive communication errors for a known, e.g., user, input, and forces the adapter to relinquish its fixed speed setting and automatically return to autobaud operation. As a result, the adapter is then able to match its serial communication speed with that of the DTE, e.g., the PC connected thereto, and hence establish accurate asynchronous serial communication therewith.

As a feature, our invention also automatically provides B-channel data compression in the event the DTE, e.g., the PC, is unwilling or unable to do so, thereby advantageously and transparently providing a user with the benefits of faster communication speeds and lower telecommunications charges potentially available therethrough. Specifically, our inventive terminal adapter monitors negotiation, over an ISDN line, of the compression control protocol (CCP) between the DTE and its local peer. If the negotiations reveal that the near-end DTE, e.g., the PC, will not undertake compression, then the terminal adapter will then automatically negotiate the protocol and thereafter, for the duration of a call, perform compression and decompression in lieu of the DTE. Such intervention by the terminal adapter is substantially, if not totally, transparent to both the user and the DTE. If a similar terminal adapter is situated on the far-end of the ISDN connection, then advantageously the far-end adapter can likewise negotiate the protocol, with its local peer and automatically perform B-channel data compression and decompression in lieu of the far-end DTE.

BRIEF DESCRIPTION OF THE DRAWINGS

The teachings of the present invention can be readily understood by considering the following detailed description in conjunction with the accompanying drawings, in which:

FIG. 4A depicts service profile identifier (SPID) formats;

FIG. 4B depicts a typical interconnection of the inventive terminal adapter with data terminal equipment (DTE), illustratively a personal computer, and an ISDN switch;

FIG. 7 depicts the correct alignment of the drawing sheets for FIGS. 7A and 7B;

FIGS. 7A and 7B collectively depict a flowchart of Automatic Switch Detection routine 700 that is executed as part of Switch Detect routine 600;

FIG. 8 depicts the correct alignment of the drawing sheets for FIGS. 8A, 8B and 8C;

FIGS. 8A–8C collectively depict a flowchart of SPID Wizard routine 800, one portion of which executes within terminal adapter 5 and another portion of which executes within the DTE connected to the adapter;

FIG. 12 depicts the correct alignment of the drawing sheets for FIGS. 12A and 12B;

FIGS. 12A and 12B collectively depict a flowchart of Compression Control Process 1200 that executes within terminal adapter 5 shown in, e.g., FIGS. 1 and 11; and FIG. 13 depicts a flowchart of CCP Negotiation process 1300 that is executed by Compression Control process 1200 shown in FIGS. 12A and 12B.

To facilitate understanding, identical reference numerals have been used, where possible, to designate identical elements that are common to various figures.

DETAILED DESCRIPTION

After considering the following description, those skilled in the art will clearly realize that the teachings of our present invention can be readily utilized in substantially any ISDN data circuit terminating equipment (DCE) which interfaces an ISDN line to data terminal equipment (DTE). The ISDN line can be, e.g., a basic rate (2B+D) interface or a primary rate (23B+D or 30B+D) interface. Inasmuch as the present invention is particularly, though certainly not exclusively, suited for use in an ISDN terminal adapter, as DCE, that connects a personal computer (PC), as DTE, to an basic ISDN line, then, to simplify the following discussion, we will discuss our invention in that context. Clearly, after considering this discussion, those skilled in the art will readily appreciate how to incorporate our invention into any ISDN DCE and modify our invention, if necessary, to conform to the requirements of any specific DTE to be connected thereto.

A. Overview of Inventive ISDN Terminal Adapter

1. Hardware

Figure 1:
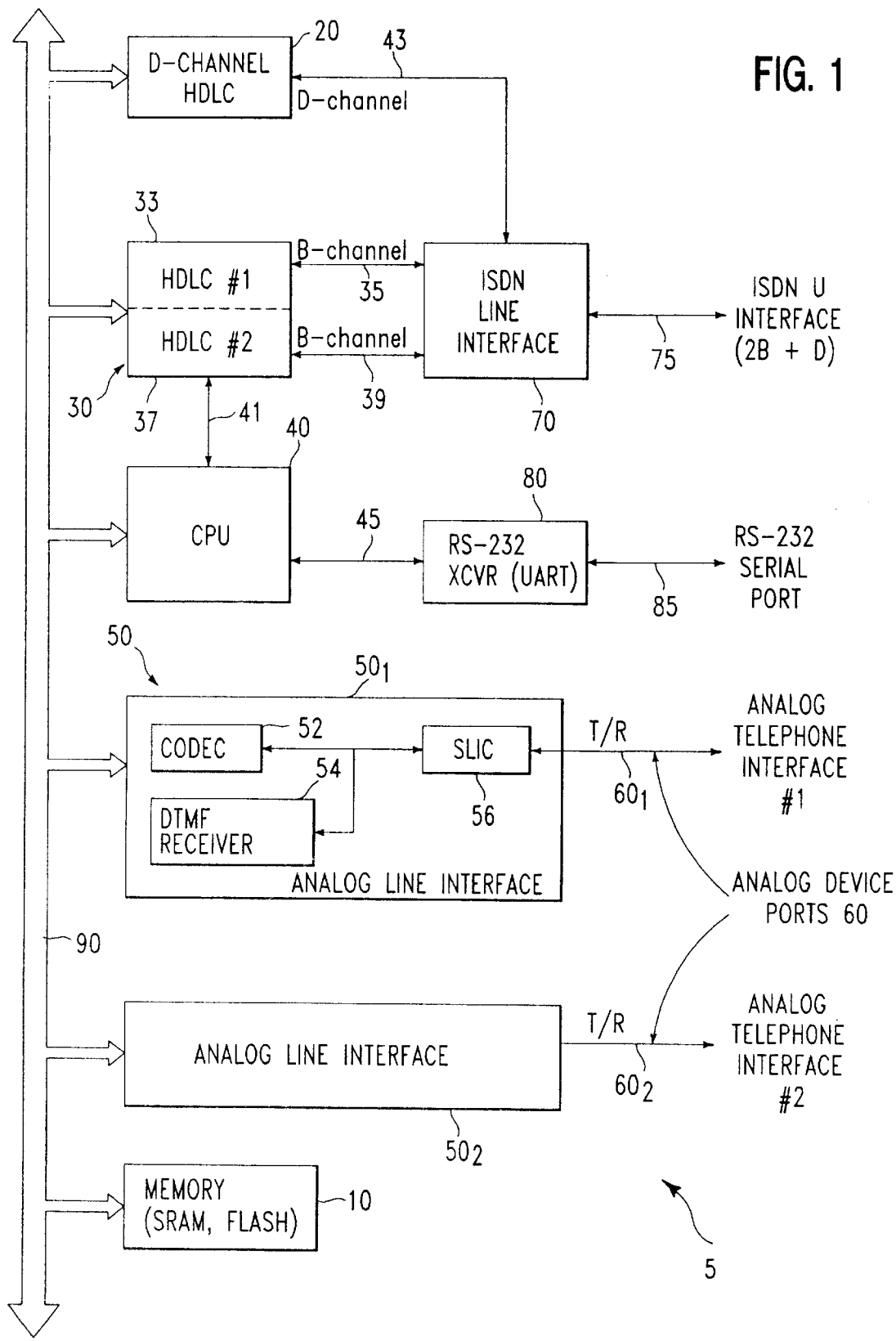
FIG. 1 depicts a block diagram of ISDN terminal adapter 5 which incorporates the present invention.

FIG. 1 depicts a block diagram of ISDN terminal adapter 5 which incorporates the present invention. As shown, terminal adapter 5, which is more commonly and rather loosely referred to as an "ISDN modem", contains memory 10; hardware data link controllers (HDLCS) 20 and 30, the latter containing identical HDLCs 33 and 37; central processing unit (CPU) 40; and analog line interfaces 50 containing identical analog line interfaces $50_1$ and $50_2$; all of which are interconnected through bus 90. In addition, the terminal adapter also contains ISDN line interface 70 and serial (RS-232) UART (universal asynchronous receiver transmitter) transceiver 80. The adapter also contains conventional power supply, combinatorial logic and clocking circuits which, for simplicity, have been intentionally omitted from the figure.

Memory 10, which illustratively comprises static random access memory (SRAM) and flash memory, stores software instructions—the salient software routines and processes being discussed in detail below, constants and temporary data all used by the CPU. The flash memory provides non-volatile program and constant storage. A portion of the SRAM is stores so-called "Stac" data compression tables for use in implementing B-channel data compression. Inasmuch as so-called "Stac" compression itself is well-known, we will not discuss the Stac compression algorithm itself in any further detail.

CPU 40 is implemented by illustratively a 68302 central processing unit (CPU) platform which is currently commercially available, as a single integrated circuit, from Motorola Corporation of Schaumberg, Illinois. This platform provides, inter alia, a core 68000-type microprocessor, internal RAM, various timers, a reduced instruction set (RISC) controller and three independent full-duplex serial communications controllers. As is evident from FIG. 2 and will be discussed below, these controllers are separately allocated to control the HDLCs for each of the B channels and for the asynchronous (RS-232) transceiver. The RISC controller directly supports the 2B channels and performs either V.110 or V.120 adaptation.

HDLCs 30 are connected, as shown in FIG. 1, through leads 41 and bus 90, to CPU 40 and, through leads 35 and 39, to ISDN line interface 70. HDLCs 30 are implemented through a MC145572 U-interface transceiver, which is also currently available commercially as a single integrated circuit from Motorola Corporation. HDLCs 30 contain two separate transceivers, each capable of being allocated by the CPU, under program control, to one of the 64 Kbit/sec B-channels for data termination and to control data transmission and reception thereover. These HDLCs along with ISDN line interface 70 and D-HDLC 20 collectively implement, in hardware, an ISDN 2B+D basic rate interface (BRI), specifically all ISDN layer 1 functionality while using 2B1Q coding. Line interface 70 is conventional and contains a U-interface transformer, common mode choke, transient suppressor, ferrite beads, diode bridge and an ISDN DC termination circuit—all of which are not specifically shown. In essence, the termination circuit provides a polarity insensitive dc termination for loop-sealing current and a recognizable signature for mechanized loop testing systems. Interface 70 passes D-channel signaling information, via line 43, to D-channel HDLC 20. The output of interface 70 provides, via leads 75, an ISDN U interface for connection to an ISDN 2B+D BRI subscriber line.

HDLC 20, which is preferably implemented by a PEB2070 integrated circuit currently commercially available from Siemens Corporation, controls the 16 Kbit/sec ISDN D-channel. This controller communicates with the CPU through bus 90.

Serial (RS-232) UART 80, connected via leads 45 to CPU 40, controls serial transmission between the CPU and the DTE, here a PC. UART 80, connected via leads 85 to a serial port of that computer, can be set to communicate serial data at baud rates up to 230 Kbaud/sec. This transceiver is controlled by one of the serial communications controllers situated within the CPU.

Analog line interfaces 50, which contain identical interfaces $50_1$ and $50_2$, are used to interface terminal adapter 5 to analog device ports 60, and particularly to two standard analog telephone devices, via output leads $60_1$ and $60_2$ (each having a tip and ring pair "T/R"), each terminating in a conventional RJ-11 jack (not specifically shown). Each interface, of which interface $50_1$ is typical and will be specifically discussed, interfaces terminal adapter 5 to a corresponding one of two analog telephone devices, connected via leads $60_1$ and $60_2$. In particular, interface $50_1$ contains codec (coder-decoder) 52, dual-tone multi-frequency (DTMF) receiver 54 and serial line interface circuit (SLIC) 56. Codec 52 converts B-channel digital data appearing on bus 90 and destined for, e.g., an analog telephone device (such as, e.g., a telephone or facsimile machine) connected to leads $60_1$, into a conventional analog telephony form. The interface also contains a conventional analog hybrid circuit, not specifically shown, which injects appropriate analog tones into tip and ring lines of an analog port, and provides echo cancellation and battery feed functions. DTMF receiver 54 collects DTMF tones appearing on the analog line, e.g., line $60_1$, connected to the interface. SLIC 56, is implemented by an AMD79R79 Ringing Subscriber Line Interface Circuit presently available from Advanced Micro Devices of Santa Clara, Calif. SLIC 56 provides conventional analog telephony (POTS—plain old telephone service) functions of: DC battery feed, over-voltage, ringing, two-wire supervision, two-to-four wire hybrid, and test functions, as well as current limiting, on-hook transmission, tip-open and loop-current protection.

As will be discussed below, each controller, whether HDLC, asynchronous RS-232or serial communications, has an associated software-implemented device driver. Under an event-driven software-implemented supervisor, CPU 40, in view of current resource requests and then available hardware resources, will assign and bind a given controller and its associated driver to a particular hardware resource in order to handle a desired ISDN connection (e.g., call send or receive) or, e.g., dynamically switch the functionality of a given B-channel to handle a voice call (or revert back to a data connection) during an on-going ISDN connection.

2. Hardware Resources and Software Processes

Figure 2:
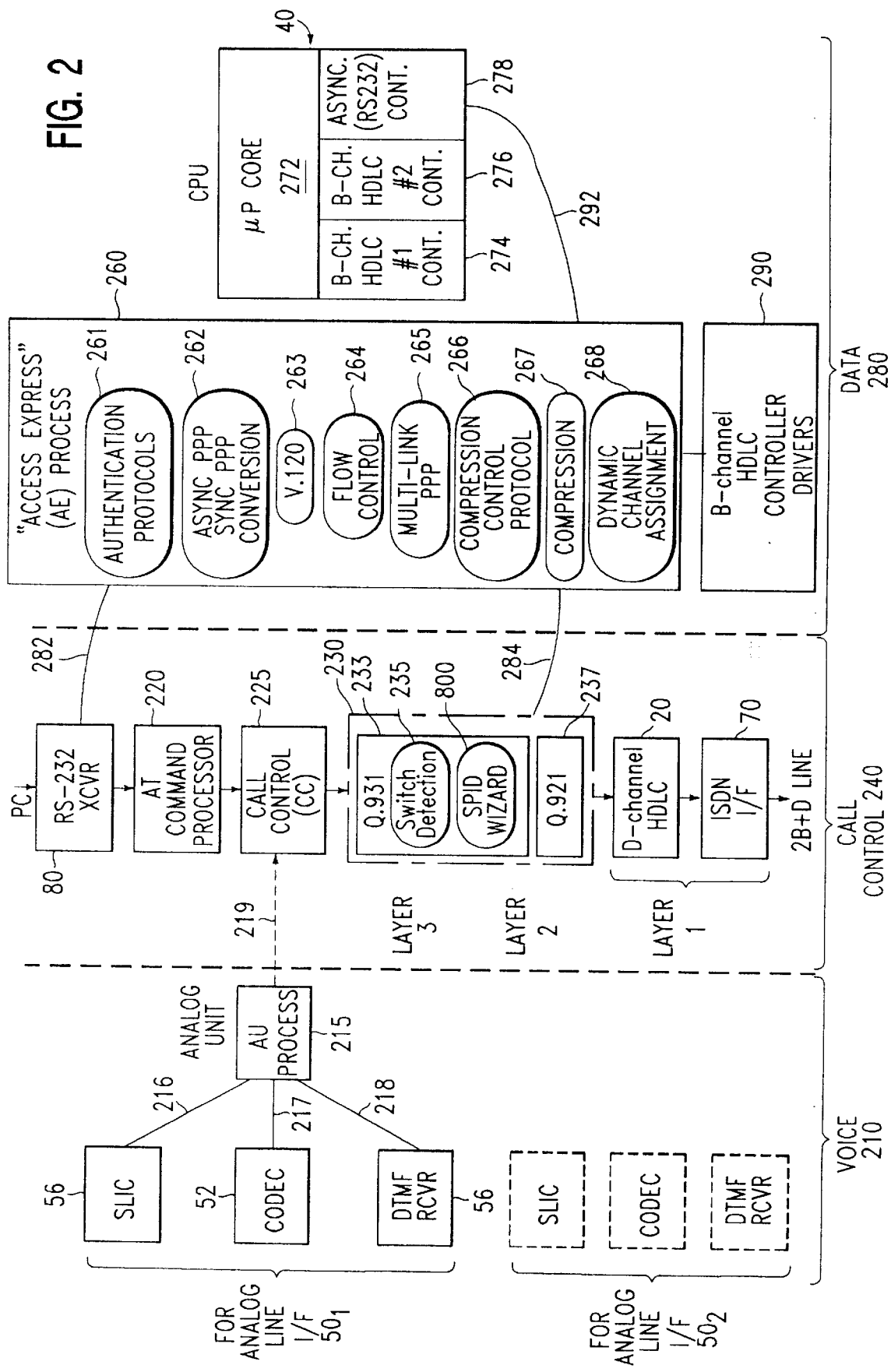
FIG. 2 diagrammatically depicts various high-level software processes and hardware resources in terminal adapter 5 shown in FIG. 1.

FIG. 2 depicts high-level hardware resources, as discussed above, that exist within terminal adapter 5 and various associated high-level software processes that execute within the terminal adapter to control the associated resources. As shown, overall functionality of the adapter can be divided into three sections: voice section 210, call control section 240 and data section 280. Voice section 210 is directed to analog (commonly referred to as "voice") telephony connections provided through analog device ports 60 (as shown in FIG. 1).

Voice section 210 includes analog telephony hardware resources: SLIC 56, codec 52 and DTMF receiver 54 that collectively implement analog line interface $50_1$; and identical components, as indicated by dashed blocks, that collectively implement analog line interface $50_2$. In addition voice section 210 is controlled by "analog unit" (AU) process 215 which, given a request for analog connection resources, either for transmitting or receiving an analog (voice) call, assigns and binds those resources to analog line interface components $50_1$, as indicated by lines 216, 217 and 218, or analog line interface components $50_2$. AU 215 responds to incoming dialed digits from an analog device attached to terminal adapter 5 or a ringing control signal for a voice connection received over the D-channel, and, through invoking associated software drivers, effectively establishes an internal connection between a B-channel and an analog line interface, and its associated analog device port, and controls communication therebetween for the duration of an analog call through terminal adapter 5. Alternatively, when a user at terminal adapter 5 causes an analog device connected to the adapter, such as an analog telephone to go "off-hook", i.e., to initiate a call, AU process 215, as symbolized by dashed line 219, sends a "call request" message to call control process 225, as described below, to obtain resources needed to complete an analog connection. Whenever AU process 215 receives digits from an analog line interface and particularly a DTMF receiver therein, such as DTMF receiver 54, AU process 215 issues a "send digits" message, containing those digits, to the call control process. Furthermore, whenever AU process 215 receives an incoming call request from call control process 225, such as for a connection via an analog interface, such as interface $50_1$, process 215 controls the ringer in a local analog telephone device connected to that interface.

Call Control section 240 contains as its high-level hardware resources: RS-232 transceiver (UART) 80, D-channel HDLC 20 and ISDN interface 70; and as its high-level software resources: "AT" command processor 220, Call Control (CC) process 225, Q.931 process 233 and Q.921 process 237. As indicated, incoming commands to establish and otherwise control an ISDN call can originate from the PC. In that regard, to establish a digital data ISDN call, a user at a his (her) PC, either manually or through a communications program executing a pre-defined communications script, will issue an "AT" command of the form "AT D X", where X is an ISDN telephone number, to the terminal adapter. AT command processor 220, which monitors all serial communication on the RS-232 port, will parse all "AT" commands from the serial communication and, in response to each such command, will determine ownership of that command, i.e., which process should execute that command. If AT command processor 220 "owns" the command, then that processor will execute the command accordingly. Alternatively, if processor 220 does not own the command, then process 220 will translate this command into an appropriate internal message and send that message to its owner, typically Call Control process 225, for execution. The owner of an "AT" command uses AT command processor 220 as a proxy agent for communicating with a host, typically the PC. Through processor 220, the command owner can write to and/or read from the RS-232 port. Once the owner has completed its processing of the "AT" command, then the owner sends an "AT complete message" to AT command processor 220. Command processor 220 then sends an "OK" or "ERROR" to the host, as appropriate, to signify that the terminal adapter has either completed its processing of the "AT" command or, while doing so, has generated an error condition and hence failed to complete the processing.

Call Control process 225 is effectively a routing engine, which manages system resources within terminal adapter 5 both from the standpoint of locating available hardware resources and software drivers and allocating those resources and drivers accordingly to appropriate ports to establish analog and digital calls as requested. Call control process 225 receives outgoing call requests from either AU process 215, as discussed above, or from AT command processor 220. Upon receipt of such a command from, e.g., process 220 (or from process 215), process 225, being event driven, will send a "call request" message to and invoke Q.931 process 233. Process 233, which is implemented as a finite state machine, provides appropriate ISDN Q.931 message encoding and decoding for communicating with an ISDN switch to control call setup and tear-down. This process, along with Q.921 process 237—both collectively forming process 230, implements, in software, well-known layers 3 and 2, respectively, of ISDN call processing. In addition, Q.931 process 233 also includes: (a) automatic switch detection functionality 235, specifically that provided by process 500 and routines 600 and 700 as shown in FIGS. 5, 6, 7A and 7B, which will all be discussed in detail below, to automatically detect a type of ISDN switch to which terminal adapter 5 is connected and appropriately configure the terminal adapter accordingly; and also (b) automatic SPID (service profile identities) Wizard routine 800, as shown in FIGS. 8A and 8B, also to be discussed in detail below, inter alia, to properly configure the SPIDs for each directory telephone number for the ISDN misconnected to the terminal adapter.

In any event, to establish an outgoing ISDN data (or B-channel voice) connection, the Q.931 process will issue, over the D-channel, a "call setup" message. This call control message, as with all other ISDN call control messages generated by terminal adapter 5, is applied, via D-channel HDLC 20 and ISDN interface 70, to the ISDN network. Once the call is delivered to its destination, a device thereat will generate either an audible ring or other indication, such as a displayed icon on, e.g., a monitor or computerized telephone instrument, to signify an incoming ISDN call. An appropriate control message is then returned by the destination device to signify that an end-user is being alerted to the incoming call. Either appropriate communication software executing at the destination device or a human stationed at a telephone can accept the call. Once the call is so accepted, an ISDN "call connect" message is delivered by the local ISDN switch, over the D-channel, to terminal adapter 5, specifically to Q.931 process 233 executing therein. In response to this "call connect" message, call control process 225 connects an assigned B-channel to an available B-channel HDLC, i.e., one of HDLCs 30, or to a codec for a voice call. All D-channel signaling messages received from the ISDN line are applied through ISDN interface 70 and D-channel HDLC 20 to Q.921 and Q.931 processes 237 and 233, in seriatim, for appropriate local processing. D-channel HDLC 20, together with ISDN interface 70, collectively implements, in hardware, ISDN layer 1 functionality. Once the ISDN connection is established, then, for example, digital data is effectively routed, as symbolized by lines 282 and 284, within terminal adapter 5 from RS-232 receiver 80 through "Access Express" (AE) process 260, which will be explained in detail below, directly to Q.921 process 237 for proper encapsulation in a Q.921 information frame and subsequent transport, via the HDLC, to the far-end DTE; thereby bypassing command processor 220, call control process 225 and Q.931 process 233. Whenever Q.921 process 237 receives an incoming information frame from the ISDN line, this process extracts a Q.931 message, such as a "call request" or "call disconnect", therefrom and sends that message to Q.931 process 233 which, in turn, appropriately instructs call control process 225 accordingly to properly allocate or deallocate resources and hence process an incoming or on-going call.

Data section 280 contains, as its high-level hardware resources: CPU platform 40; and, as its high-level software resources: AE process 260 and B-channel HDLC controller drivers 290. From a perspective of handling B-channel data, CPU platform 40, shown within data section 280, can be represented by microprocessor core 272 along with its three independent full-duplex serial communications controllers 274, 276 and 278; the first two being used as B-channel HDLCs 1 and 2, respectively, and the last one being used as an asynchronous controller for controlling RS-232 transceiver (UART) 80. While the asynchronous controller sets and supervises the operation of the UART, this controller is itself controlled, as symbolized by line 292, by AE process 260, this process being discussed in detail below. B-channel HDLC controller drivers 290, executing within CPU 40, collectively control the operation of B-channel HDLCs 274 and 276, with a separate one (not specifically shown) of those drivers controlling each such B-channel HDLC.

AE process 260, which executes within CPU 40, contains various event-driven software processes: authentication protocols process 261, asynchronous (async) point-to-point (PPP) to synchronous (synch) PPP conversion process 262, V.120 protocol process 263, flow control process 264, multi-link PPP process 265, compression control protocol (CCP) 266, compression 267, and dynamic channel assignment process 268. Collectively speaking, AE process 260 appropriately configures an ISDN connection, specifically the protocols and compression, if any, to be used for data transport thereon, and then manages that connection for its duration.

Advantageously, our inventive terminal adapter supports the PPP protocol. In that regard and to the extent relevant, the PPP protocol is comprised of three major components (phases), all of which are advantageous for use in an ISDN networked connection: (a) a method for encapsulating multi-protocol datagrams; (b) a link control protocol (LCP) for establishing, configuring, and testing an end-to-end data-link, e.g., ISDN, connection and authentication protocols for authenticating that connection; and (c) a family of network control protocols (NCPs), such as a compression control protocol (CCP), for establishing and configuring different network-layer protocols. With this in mind, once an ISDN connection has been connected and the PPP protocol has been negotiated for use thereon, AE process 260: monitors and sometimes authenticates, through authentication protocols 261 (e.g., password authentication protocol, challenge handshake authentication protocol and "Shiva" protocol), the users on both sides of the connection; monitors the protocols in use on both sides of the connection (e.g., AppleTalk, IP and IPX on one side; IP, IPX and DecNet on the other) and those thereof that are common to both sides and thus can be used through the connection (e.g., IP and IPX); establishes, through multi-link PPP process 265, a multi-link PPP connection, if desired and supported by a PPP peer, in order to utilize both B-channels for data transport during a common digital call, hence creating a single virtual digital channel providing, with use of compression, as much as 230 Kb/sec of available bandwidth; and determines whether, during through the NCPs, compression will be performed and whether by the PC, as DTE, or by terminal adapter 5, as DCE, through appropriate negotiation of CCP 266—which will be discussed in detail below in conjunction with FIGS. 11, 12A, 12B and 13. Multi-link PPP, which is a conventional and well-known protocol, involves segmenting, at a transmitting DCE, a message frame into sub-frames and simultaneously sending sub-frames over both B-channels whereupon, at a PPP peer, those sub-frames are properly assembled to reconstitute the single message frame. In addition, process 262, also performed by AE process 260, transparently converts async PPP frames emanating from the PC, via its RS-232 port, to sync PPP frames for transport over an ISDN network, and converts incoming sync PPP frames from the network and into async PPP frames for application to the PC. Inasmuch as a serial port on a PC only operates asynchronously, a PC can only accommodate asynchronous PPP frames. An ISDN network, on the other hand, utilizes, for increased bandwidth, synchronous transmission, hence supporting synchronous PPP and not asynchronous PPP. For complete details regarding the need for async-to-sync PPP conversion and the specific manner through which our inventive terminal adapter provides this conversion, the reader should refer to co-pending United States patent application entitled: "Method and Apparatus for Asynchronous PPP and Synchronous PPP Conversion", filed: Jul. 25, 1995; assigned Ser. No.: 08/506,533; and which is owned by the present assignee hereof and is incorporated by reference herein. Alternatively, if the ISDN connection is established but, for whatever reason, the PPP protocol cannot be negotiated for use thereover, then AE process 260 instead utilizes the V.120 protocol for B-channel data carriage through execution of V.120 process 263.

In addition, flow control process 264, executing within AE process 260, responds to appropriate conventional serial commands such as RTS/CTS (request to send/clear to send) or XON/XOFF, (transmitter on/transmitter off) emanating from the PC and routed via RS-232 transceiver (UART) 80, to start and stop the flow of serial data applied from the terminal adapter to the PC and control the operation of the UART accordingly. Compression process 267, when enabled, as discussed below in conjunction with processes 1200 and 1300 shown in FIGS. 12A, 12B and 13, implements the "Stac" compression and decompression for the serial data stream. Lastly, Dynamic Channel Assignment process 268 is invoked by AE process 260 to dynamically deallocate one of two B-channels initially assigned to an ISDN call in order to simultaneously utilize that channel, during an on-going ISDN connection, to establish and carry an analog call, e.g., a voice call, over a separate connection and to reallocate that channel back to the ISDN connection at the completion of the analog call, provided the caller of the analog call is the one who initiated the ISDN call. This dynamic channel assignment automatically occurs whenever, e.g., a user lifts a handset (i.e., goes "off-hook") of an analog telephone connected to the terminal adapter during an on-going ISDN call, thereby causing a "call request" or a "call connect" message to be generated by AU process 215 and hence an appropriate message to be produced by call control process 225.

B. Resource Allocation and Process Interaction for Call Handling

Figure 3:
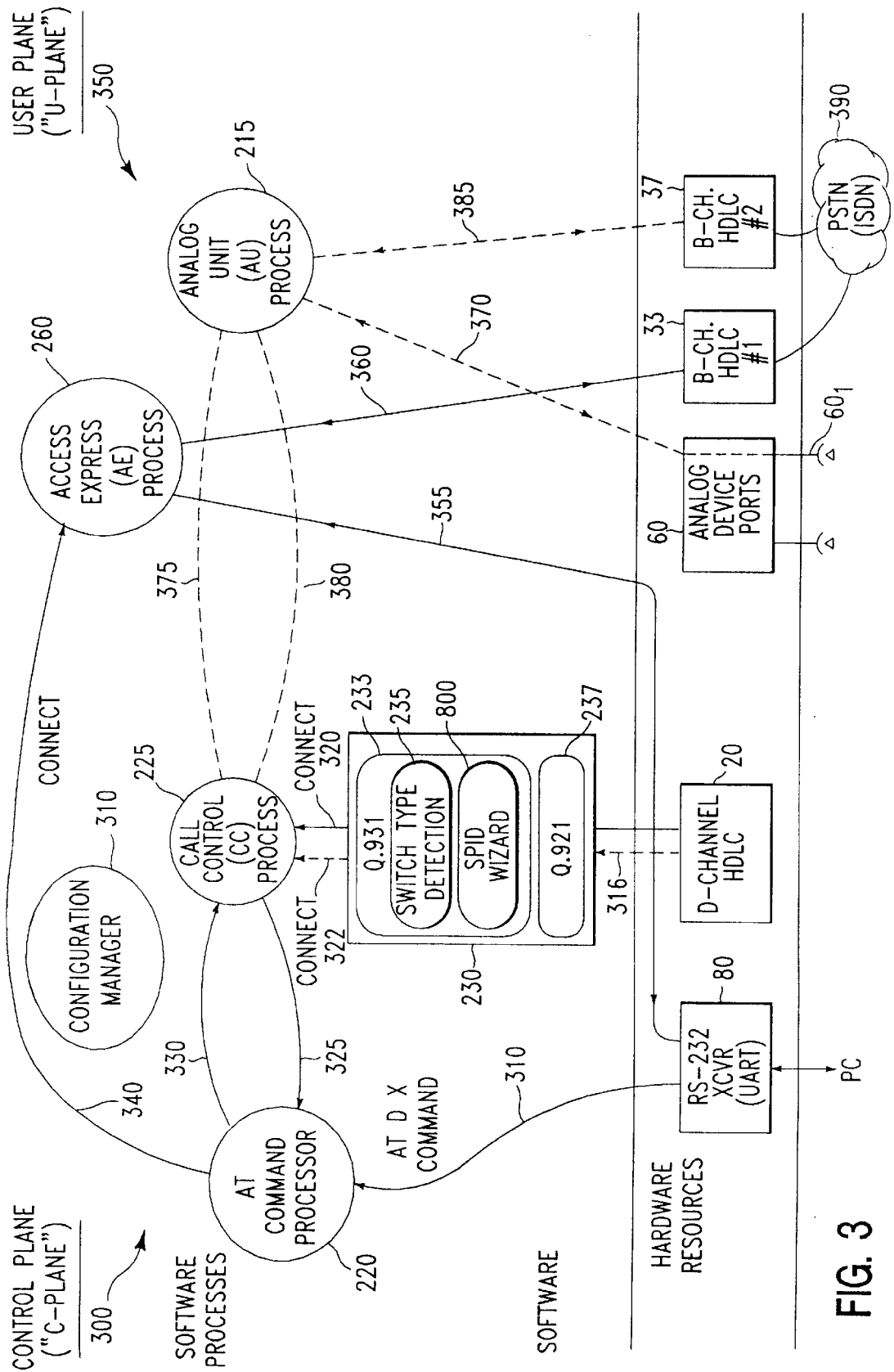
FIG. 3 graphically depicts interaction between various high-level software processes and hardware resources that are employed in terminal adapter 5 for illustratively connecting and handling both ISDN and analog calls.

With the above in mind, FIG. 3 graphically depicts interaction between various high-level software processes and hardware resources that are employed in terminal adapter 5 for illustratively connecting and handling both ISDN and analog calls. Terminal adapter 5 can be viewed as formed of two inter-working portions: control plane (C-plane) 300 and user plane (U-plane) 350. C-plane 300 processes call control information; while U-plane 350 handles user-supplied analog communication and digital data which is to be communicated during a call. Call control information is processed by the terminal adapter, while user-supplied analog communication or digital data are appropriately routed by the adapter between corresponding hardware components during a call. To ease understanding, solid lines indicate control and digital data communication messaging and flow for an ISDN call; dashed lines indicate control messaging and analog communication flow for an analog call.

As discussed above, ISDN calls can occur in either of two directions: outgoing from terminal adapter 5, and incoming thereto from an ISDN network. Outgoing calls originate with "AT" commands, specifically a command of the form "AT D X" (where X is a telephone number), issued by the PC connected to RS-232 transceiver 80. These commands are then routed, as symbolized by line 310, by a driver for the RS-232 transceiver to AT command processor 220. AT command processor 220 then sends a request, as symbolized by line 330, to Call Control (CC) process 225 for appropriate resources to be allocated to handle the call. If CC process 225 determines that sufficient hardware resources, e.g., HDLCs, are then available to handle the call, CC process grants the request and so informs, as symbolized by line 325, AT command processor 220 and so identifies the resources that have been so allocated. With the request having been granted, the AT command processor then issues, as symbolized by line 340, an appropriate "connect" message to AE process to establish an internal data connection between the allocated resources. For an ISDN data call, the resources would be RS-232 transceiver 80, so as to provide a link to the PC, and an available B-channel HDLC, here illustratively B-channel HDLC 33 which, in turn, is connected, via an ISDN connection, to public switched telephone network (PSTN) 390. This internal data connection is represented by lines 355 and 360 which connect, through AE process 260, RS-232 transceiver 80 and B-channel HDLC 33. If both B-channels are then available, then the data connection will encompass B-channel HDLC 37 as well, for use in negotiating and subsequently using, if possible, the multi-link PPP protocol. Once this connection between the RS-232 transceiver and the B-channel HDLC (s) is established within terminal adapter 5, AT command processor 220, CC process 225, and process 230 merely supervise the remainder of the call, with call payload information (whether analog or digital) effectively bypassing these processes.

To establish an ISDN connection for an incoming ISDN call, a D-channel ISDN "call setup" message from a local ISDN switch is routed to process 230, via the PSTN network and D-channel HDLC 20. This process then instructs CC process 225 to allocate, assign and establish an internal connection between available hardware resources, in the manner set forth immediately above, to handle the call. If the connection was successfully established, then process 230 issues a ringing message to AT command processor 220 which, in turn, sends an appropriate message to the PC to signify an incoming call. The PC can accept or decline the call by issuing an appropriate "AT" command. Once the PC signifies its acceptance to AT command processor 220, this process, in turn, indicates the acceptance to CC process 225. Process 225, specifically Q.931 process 233 therein, issues an ISDN "call connect" message for transport over the PSTN in order to signify call acceptance to the local ISDN switch.

Configuration Manager 310 is invoked during power-up and initialization of the terminal adapter to appropriately configure the adapter. Configuration parameters, such as, e.g., ISDN switch type, SPID for each ISDN directory telephone number, RS-232 baud rate, specific analog device port (if any) to which voice calls are to be routed (e.g., for situations where a facsimile machine (s) or other data device is to be connected to the other (or both) analog device port(s)), are stored in flash memory within the adapter for subsequent retrieval and use. Alternatively, if Configuration Manager 310 determines that the adapter has not been configured for use or has been moved to a new location where it is connected to an ISDN switch of a different type than that for its immediately prior use—hence requiring re-configuration, Manager 310 will automatically invoke configuration.

In addition, Q.931 process 233 contains switch type detection process 235, specifically process 500 and routines 600 and 700 as discussed in considerable detail below in conjunction with FIGS. 4–7B, to automatically detect the type of ISDN switch to which the terminal adapter is currently connected and to set an internal register within the terminal adapter (referred to herein as register "S50") accordingly. Q.931 process 233 also performs SPID Wizard routine 800, as discussed in considerable detail below in conjunction with FIGS. 8A and 8B, to automatically configure the SPID for each directory telephone number for the ISDN lines connected to the terminal adapter. Routine 800 also, if necessary refines and updates the detected switch type. Once so configured, the resulting SPIDs are stored within Configuration Manager 310 for subsequent retrieval and use. Routine 800 can also be invoked manually upon user request.

Analog calls can also occur in either direction: either outgoing from terminal adapter 5 or incoming from PSTN 390. To establish an outgoing analog call, a user places an analog device, such as a telephone connected to line 60₁, connected to the terminal adapter in an off-hook condition, such as by lifting its handset. An off-hook state is detected by analog device ports 60 with an appropriate indication thereof being sent, as symbolized by dashed line 370, to AU process 215. This process, in response to this indication, sends a request for resources, as symbolized by dashed line 375, to CC process 225. If, in the same manner as occurs during an ISDN call, CC process 225 determines that sufficient hardware resources, e.g., analog device port (s) and B-channel HDLC (s), are then available to handle the call, CC process grants the request and so informs, as symbolized by line 380, AU process 215 and so identifies the resources that have been so allocated. AU process 215 then establishes an internal data connection between the allocated resources. For an illustrative allocation of one of the analog device ports 60 and B-channel HDLC 37, this internal connection is represented by dashed lines 370 and 385 which connect these resources through AU process 215. Once this connection has been established, CC process 225 merely supervises the remainder of the call, with analog call payload information effectively bypassing this process.

To establish a connection for an incoming analog call, a D-channel voice "call setup" message from local ISDN switch is routed, as symbolized by dashed line 316, to process 230, via the PSTN network and D-channel HDLC 20. This process then instructs, as symbolized by dashed line 322, CC process 225 to allocate, assign and establish an internal connection between available and appropriate hardware resources to handle the voice call. If the connection was successfully established, then process 230 issues a ringing message to AU process 215 which, in turn, sends a ringing signal to the analog device, e.g., a telephone situated on line 60₁, terminating the call. The user can accept or decline the call by, e.g., taking the handset of a telephone off-hook or not. Should the user take the handset off-hook, then this state change is detected by analog device ports 60 and, in turn, is passed to AU process 215. In response, a D-channel voice "call complete" message is then sent by Q.931 process, via D-channel HDLC and the PSTN, to the local ISDN switch to complete the call. Accordingly, the internal connection within the terminal adapter is then maintained by AU process 215 between, e.g., allocated and assigned B-channel HDLC 37 and analog device ports 60, for the duration of the analog call.

Ideally, an ISDN terminal adapter should be as easy for a subscriber to install and use as is a conventional analog modem. However, in practice and for various reasons, installing a conventional ISDN terminal adapter is rather tedious, frustrating and time consuming.

Advantageously, our inventive terminal adapter substantially, if not totally, remedies these deficiencies. Specifically, the inventive terminal adapter automatically detects the type of ISDN switch to which the adapter is then connected and configures the SPID correctly for that particular switch, provides both baud rate unblocking and automatic data compression.

C. SPID Formats, Switch Detection and SPID Formation

As noted previously, different ISDN switches, particularly those destined for use in the United States or Canada, exist which manifest idiosyncratic operational differences that complicate installation and use of an ISDN terminal adapter. One such difference lies in the format of a so-called service profile identifier (SPID) which is transmitted by and separately identifies, to the switch, each DCE connected thereto.

In particular, FIG. 4A depicts service profile identifier (SPID) formats.

Generally speaking, a SPID is formed of format 410 which contains a predefined prefix, followed by a seven- or ten-digit subscriber directory telephone number, followed by a predefined suffix. However, within this generic form, implementational differences exist as to the actual prefix and suffix used. In that regard, specific SPID formats 420, for exemplary directory telephone number "5301234", contain SPIDs, as required by different ISDN switches, in which a prefix, depending upon the switch type, is either illustratively "01", "10", or "01"; and the suffix is either illustratively "000" or "001". A SPID established for use with one type of ISDN switch will not likely function with another type of ISDN switch; thus, completely preventing any ISDN calls from being established through the latter switch. Hence, the SPID format used by the DCE must exactly match that required by the switch to which that DCE is connected. Not only can SPID inconsistencies arise during installation of a conventional terminal adapter but also they can arise later should the terminal adapter be moved to a different location and connected to an ISDN line served by a different type of ISDN switch than that which the adapter was previously connected. Inasmuch as an ISDN line carries two individual subscriber telephone numbers, one for each B-channel, such a line has two SPIDs, one for each of these telephone numbers. Since both numbers will be served by the same ISDN switch, the format is the same for both SPIDs, though the SPIDs themselves, owing to the differing telephone numbers, will numerically differ from each other.

We will now proceed to describe the technique, both in terms of its apparatus and methods, through which inventive terminal adapter 5 automatically detects the ISDN switch type and forms a properly-formatted SPID (s) therefor. To simplify the following discussion, we will discuss this technique in the context of a typical interconnection, as shown in FIG. 4B, of terminal adapter 5, as DCE, for connecting a personal computer, specifically PC 430, as DTE, through BRI (2B+D) ISDN line 75, to an ISDN switch, specifically switch 480. User input is supplied to the PC, as symbolized by line 425. Serial RS-232 output from the PC is coupled, via leads 85, to the RS-232 port on the terminal adapter. As noted above, in this configuration, terminal adapter 5 is rather loosely and commonly referred to an "ISDN modem".

Figure 4C:
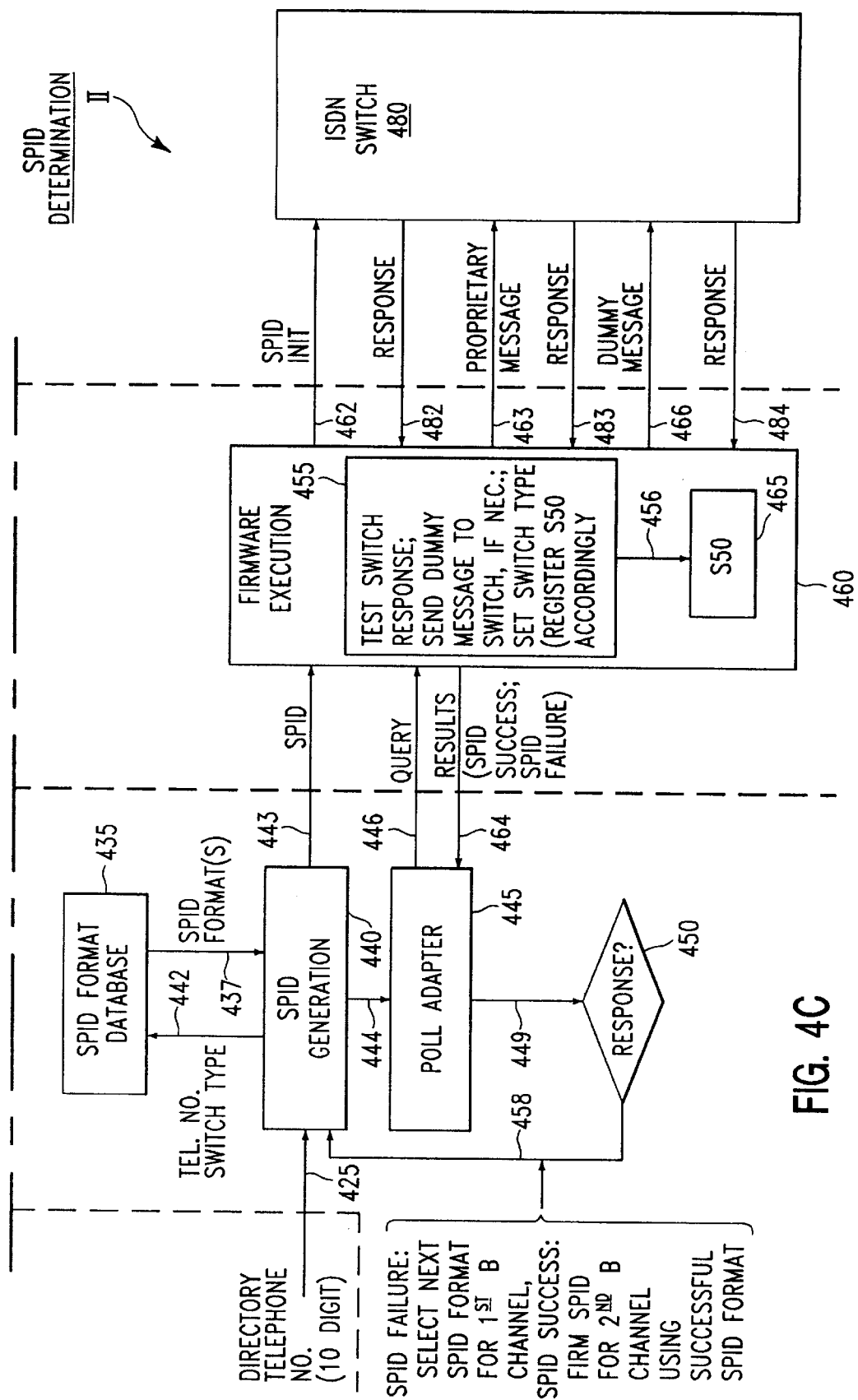
FIG. 4C diagrammatically depicts the interaction which occurs between terminal adapter 5 and ISDN switch 480, as shown in FIG. 4B, for switch identification; and that which occurs among personal computer 430, terminal adapter 5 and ISDN switch 480, as shown in FIG. 4B, to form a proper SPID therefor.

To appreciate the particular software processes used by our inventive terminal adapter to automatically detect the type of ISDN switch to which the terminal adapter is currently connected, and, during configuration, form a properly-formatted SPID (s) for use with that particular ISDN switch, we will first describe these operations and their interaction, as diagrammatically shown in FIG. 4C, then as shown in flowchart form in FIGS. 5–8C. The reader should simultaneously refer to all these figures throughout the following discussions of switch detection and SPID formation. These processes are implemented through programmed instructions collectively stored within program store (memory) 432 of the DTE (here the PC) and within memory 10 in terminal adapter 5 (as shown in FIG. 1).

FIG. 4C diagrammatically depicts the interaction which occurs between terminal adapter 5 and ISDN switch 480, as shown in FIG. 4B, for switch identification; and that which occurs among personal computer 430, terminal adapter 5 and ISDN switch 480 for SPID formation.

The interaction for switch identification is represented by lines 434 and 439 in portion I of FIG. 4C. Here, certain switches will send different D-channel initialization messages as well as provide different response messages to predefined control messages sent by the terminal adapter. Terminal adapter 5 contains a memory-based register, referred to as simply register "S50", which stores a value representing the type of ISDN switch to which the adapter is connected. The adapter automatically detects the switch type by analyzing D-channel messages which are received by the terminal adapter from the switch, both ISDN initialization messages as well as specific response messages, and sets the value in this register accordingly.

The switch type value is then used, during SPID determination, in conjunction with the directory telephone number of the user, to access an internal database, specifically a table, (stored within memory 10 shown in FIG. 1) of predefined SPID formats, referenced in terms of particular telephone service areas and switch types, to access the possible SPID format (s) for the ISDN switch to which the adapter is likely connected.

SPID formation, as diagrammatically shown in portion II of FIG. 4C, relies on interaction among the user, personal computer 430 (DTE), terminal adapter 5 and ISDN switch 480 (the switch being located at a telephone company central office). In essence, firmware executing within terminal adapter 5, in conjunction with software executing within the personal computer, forms one of more SPID (s) appropriate for the ISDN switch to which the adapter is connected, queries the switch with each of these SPIDs to select and verify a correct SPID from those formed, and, if necessary, further refines the switch type previously determined and so updates the contents of register S50 accordingly.

In particular, operations performed within the PC, for forming the correct SPID (and refining the switch type), can be broken into three basic portions: SPID generation operation 440, poll adapter operation 445; and test response operation 450. In addition, the PC stores predefined database 435 of SPID formats. Specifically, this database contains the SPID format (s) currently in use for each telephone area code within a given widespread calling region, such as illustratively North America, and within each such area code, for each different type of ISDN switch used therein. The actual software that implements these operations and the database is part of configuration software that is stored on, e.g., diskette or other media, such as a CD-ROM, and distributed with the terminal adapter. During actual installation of the adapter, after a user has physically connected the adapter to the PC and the ISDN line, and has then powered-up the adapter and invoked an appropriate operating system (such as, e.g., the "Window 95" or "Windows NT" operating system) on the PC, that user can then insert the diskette into his (her) PC and then load and execute the configuration program to determine the proper SPID format. For simplified manufacturing of a single worldwide version of terminal adapter 5, database 435 can also contain the single SPID format which might be used in Europe. In addition, this database can contain SPID information, as appropriate, for other countries or regions of the world as desired, e.g., any other country than those in North America, where ISDN service is being or is likely to be offered and where terminal adapter 5 is likely to be used.

Once the user has powered-up the terminal adapter, after connecting it to the ISDN line, the adapter, automatically and independently of the user, will attempt to identify the type of ISDN switch to which the adapter is connected. As noted above, an initial identification of the switch type will then be stored within register S50 in the adapter.

Thereafter, through SPID generation operation 440, the PC will initially prompt the user to enter the first 10-digit directory telephone number, including area code, associated with the ISDN line to which the adapter is connected. Using this number and the switch type stored in register S50, SPID generation process 440 will query SPID format database 435 to obtain one of the SPID format (s) that is required for the type of switch which the terminal adapter has likely identified. If, as will be discussed below, this particular SPID format fails, i.e., it is not compatible with the actual ISDN switch in use, then additional SPID formats for that area code will be successively accessed, one-by-one, in succession and tested to determine which of those formats is correct.

In any event, once SPID generation operation 440 retrieves a SPID format from the database, this operation builds the SPID, according to this format and with the directory telephone number entered by the user, and then sends that SPID, as symbolized by line 443, to the terminal adapter. In response, firmware 460 executing within the adapter generates an ISDN "SPID Init" message containing this particular SPID and transmits, as symbolized by line 462, that message, over the D-channel, to ISDN switch 480. Pending receipt of a response from the adapter, the PC performs polling operation 445 to repeatedly poll (i.e., query) the adapter for the switch response. The "SPID Init" message attempts to initially identify the terminal adapter now actually connected to the switch and establish a correspondence within the switch between this adapter and a SPID for this adapter previously established by telephone company personnel. The polling message (s) is symbolized by line 446. Eventually, the ISDN switch issues, as symbolized by line 482, a response to the "SPID Init" message and sends that response to the adapter. Operations 455, performed within the adapter test this response, and if necessary, send proprietary or dummy ISDN D-channel messages to the switch to further refine the switch type. If operations 455, as symbolized by line 464, produce a result indicating that the SPID is correct, then decision operation 450 invokes SPID generation operation 440, via path 458, to prompt the user for his (her) second ISDN telephone number. Inasmuch as the correct SPID format has now been determined for the first telephone number, SPID generation operation 440 builds the SPID for the second number using this particular format. This "second" SPID is then sent to the ISDN switch, with its response then being tested, through operations 445 and 455. When the second SPID is accepted by the switch, SPID determination is complete; hence operations 450 terminate.

Alternatively, if the result indicates that the SPID is incorrect, i.e., a requested "SPID Init" operation in the switch has failed with the response to the PC being an ISDN "SPID failure" message, then decision operation 450 instructs SPID generation operation 440 to access the next successive SPID format for the area code of the user, build a new SPID using that format and the first telephone number entered by the user and apply that new SPID to the switch. The adapter is then polled for the result, with the result then tested accordingly through operations 445 and 455, and so on.

If, however, the identified switch type is one that is common to, e.g., two switches produced by, e.g., two different manufacturers, such as an NI-1 switch manufactured by both AT&T (its ISDN switch manufacturing is now being conducted by "Lucent Technologies") as an AT&T 5E NI-1 switch or a Northern Telecom NI-1 switch, then to refine the switch type to one of these two particular switches, operations 455, as noted above, executing in the terminal adapter, send a proprietary message to the switch, as symbolized by lines 463. This message, which is valid for one of these two switches but not the other, will elicit a valid response from only one of these switches. The proprietary message is one that provokes a benign response from the one switch. Based upon the response, as symbolized by line 483, to the proprietary message, i.e., whether the response is valid or not, operations 455 will update, as symbolized by line 456, register S50 (denoted as block 465) in the adapter to reflect the proper switch type; e.g., the Northern Telecom NI-1 switch, if the response is valid, the AT&T 5E NI-1 switch if the response is invalid. Once the switch type has been updated accordingly, operations 450 invokes SPID generation operation 440 to build the SPID for the second telephone number, and so forth. In a similar fashion, if the identified switch type is not an NI-1 switch, then the switch could be an AT&T 5E Multi-point switch. To test for this particular switch, operations 455 will send a so-called "dummy message", as symbolized by line 466, which will elicit a specific benign response; as symbolized by line 484, from this particular switch. Operations 455 will then update register 550 accordingly.

Having discussed the interaction involved with switch type detection and SPID formation, we will now turn to describing, through flowcharts, the salient processes used therein.

Figure 5:
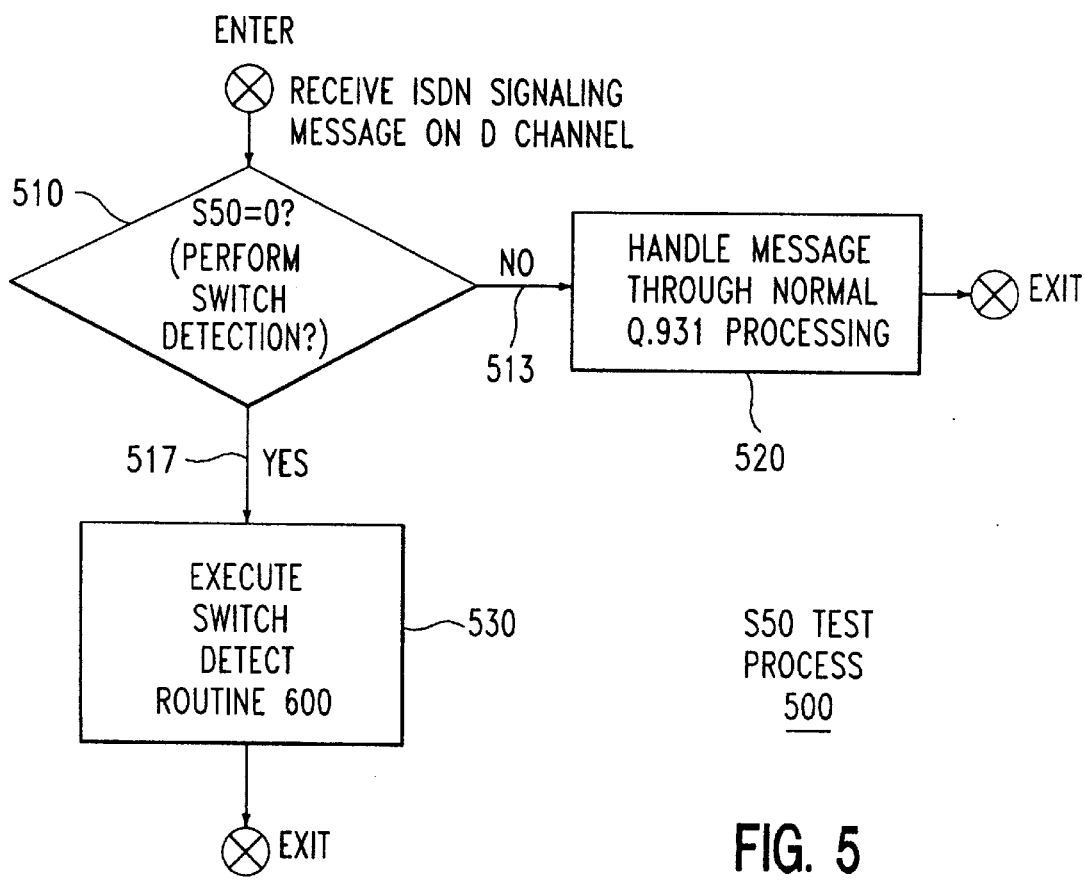
FIG. 5 depicts a flowchart of S50 Test process 500 which is performed within Q.931 process 233 shown in FIG. 2.

FIG. 5 depicts a flowchart of S50 Test process 500 which is performed within Q.931 process 233 shown in FIG. 2. Process 500 is performed, within terminal adapter 5, for each incoming ISDN message produced by the switch. Upon entry into process 500, decision block 510 is executed to test the contents of register S50. If the contents are non-zero (zero being programmed therein during manufacture of the adapter), then a switch type has been previously determined. In this case, execution passes, via NO path 513, to block 520. This latter block handles the ISDN message through normal Q.931 processing, after which execution exits from process 500. Alternatively, if the contents of register S50 are zero-valued, then decision block 510 routes execution, via YES path 517, to block 530. This latter block, when executed, executes Switch Detect routine 600 to automatically detect the switch type. Once this occurs, execution exits from process 500. In the event, for example, the terminal adapter has been moved to a new location and is connected to an ISDN line served by a switch having a different type than that to which register S50 has previously been set, then the configuration manager, sensing an inability to communicate with the new switch, will issue an appropriate "AT" command itself to set the contents of register S50 to zero to automatically invoke, via process 500, switch type detection. In addition, the user, stationed at the PC, can also issue an appropriate "AT" command to the adapter at any time to manually set the contents of this register to zero and thereby invoke switch type detection.

Figure 6:
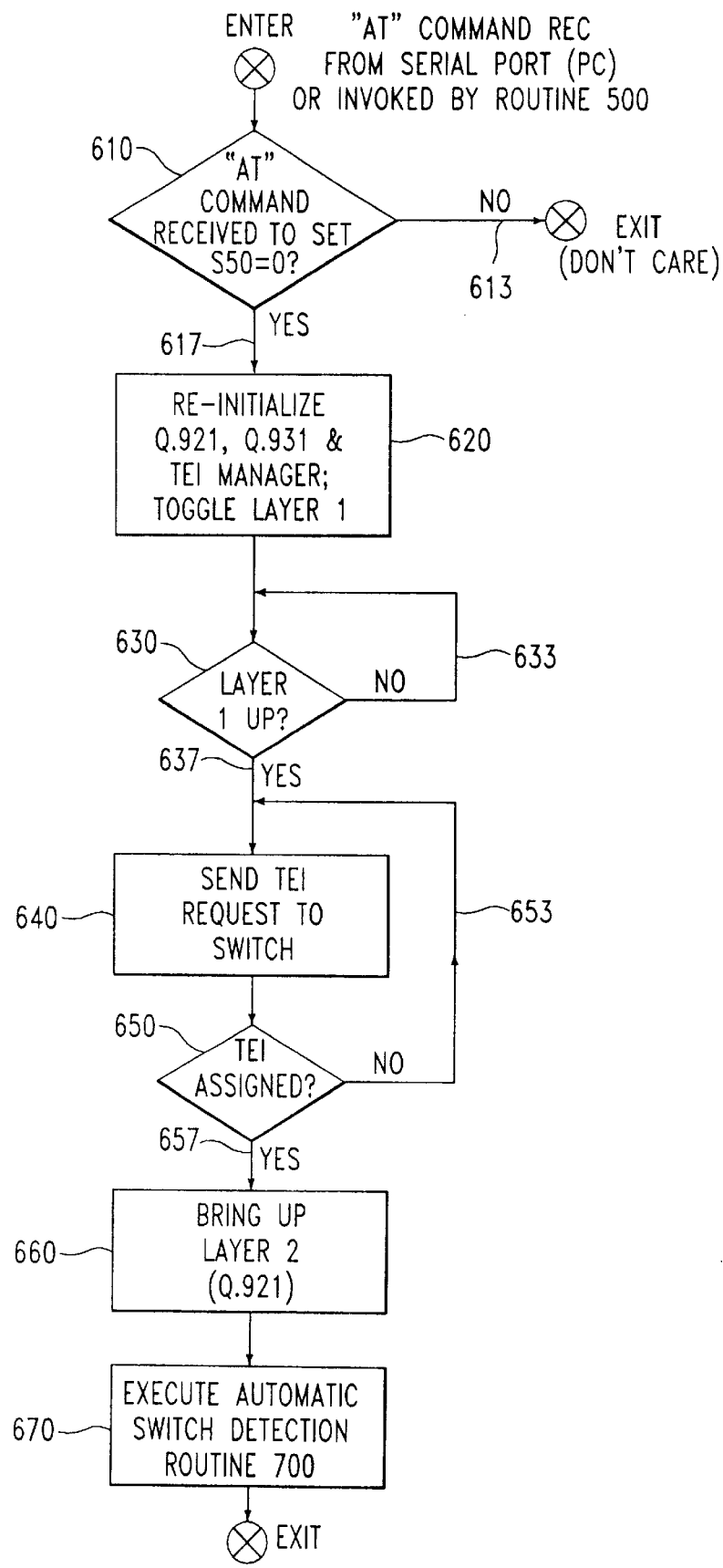
FIG. 6 depicts a flowchart of Switch Detect routine 600 which is executed within process 500 shown in FIG. 5.

FIG. 6 depicts a flowchart of Switch Detect routine 600. Upon entry into this routine, execution first proceeds to decision block 610. This block determines whether an "AT" command was received, by AT command processor 220 (see FIG. 3) to set register S50 to zero. As noted, this register can be set as a result of such a command issued by either Configuration Manager 310 or the PC. In any event, as shown in FIG. 6, if no such command has been received, then execution merely exits, via NO path 613, from routine 600.

Alternatively, if such a command was received, decision block 610 routes execution, via YES path 617, to block 620. Register S50 will be set to zero by AT command processor 220 (see FIG. 3) rather than by routine 600. In any event, as shown in FIG. 6, block 620, when executed, re-initializes layers Q.921 and Q.931 as well as a so-called "Terminal Endpoint Identifier" (TEI). The TEI is a unique identifier used by each DTE to identify itself to an ISDN switch. The value of this parameter is supplied by the switch to the DTE during initial communication between the switch and the DTE and is thereafter used by the DTE in each communication with the switch. Inasmuch as terminal adapter 5 merely reflects the TEI value supplied by the ISDN switch in each communication thereto, the actual value assigned by the switch to this parameter is immaterial to the adapter. By re-initializing the TEI, block 620 effectively informs the switch that the terminal adapter is no longer connected to it. Thereafter, block 620 toggles hardware layer 1. By toggling this layer, the ISDN switch starts initial negotiations with terminal adapter 5 to establish its identity. Various messages that occur subsequent to these layer 1 negotiations, and particularly during Q.931 initial negotiations, are analyzed, as discussed below, to determine the switch type. Inasmuch as toggling layer 1 and the negotiations therefor may consume upwards of approximately 10 seconds, execution proceeds to decision block 630. This block determines whether layer 1 has been completely brought up. If not, execution merely loops back, via NO path 633, to wait accordingly. Once this layer is successfully brought up, then decision block 630 routes execution, via YES path 637, to block 640. This latter block, when executed, sends a generic D-channel ISDN request to the switch to assign a TEI to the adapter. All ISDN switches utilize the same request. Once the request is sent, execution proceeds to decision block 650 which, when executed, tests for a response and particularly whether a TEI has been assigned by the switch. If not, then execution loops back, via NO path 653, to block 640 to issue another TEI request to the switch, and so forth. Once a TEI has been assigned, execution proceeds, via YES path 657, emanating from decision block 650, to block 660. This latter block brings up layer 2, i.e., Q.931 process 237 (see FIG. 3). Thereafter, as shown in FIG. 6, execution proceeds to block 670 to execute Automatic Switch Detection routine 700. Thereafter, execution exits from routine 600.

Figure 7B:
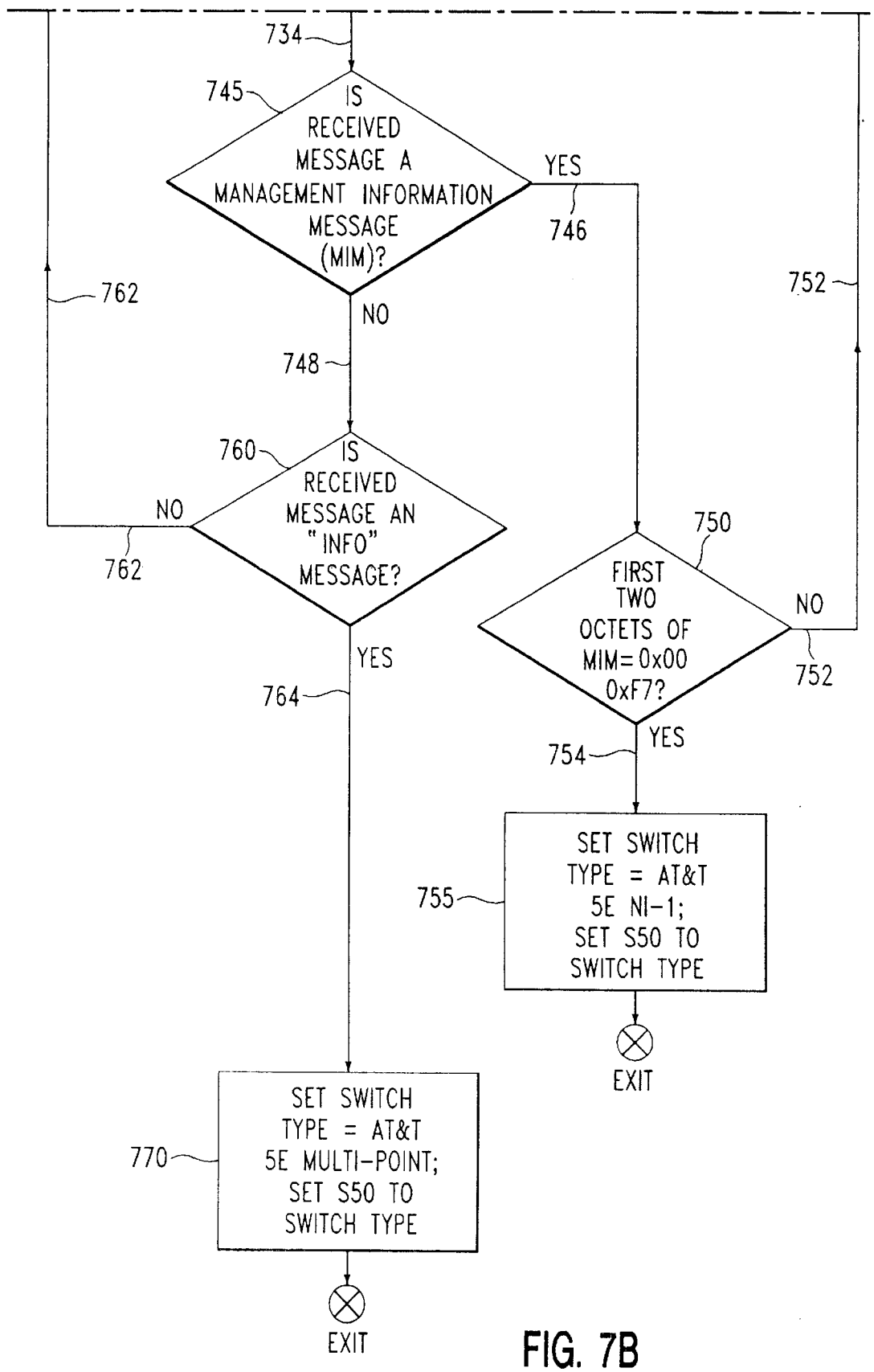
Figure 8B:
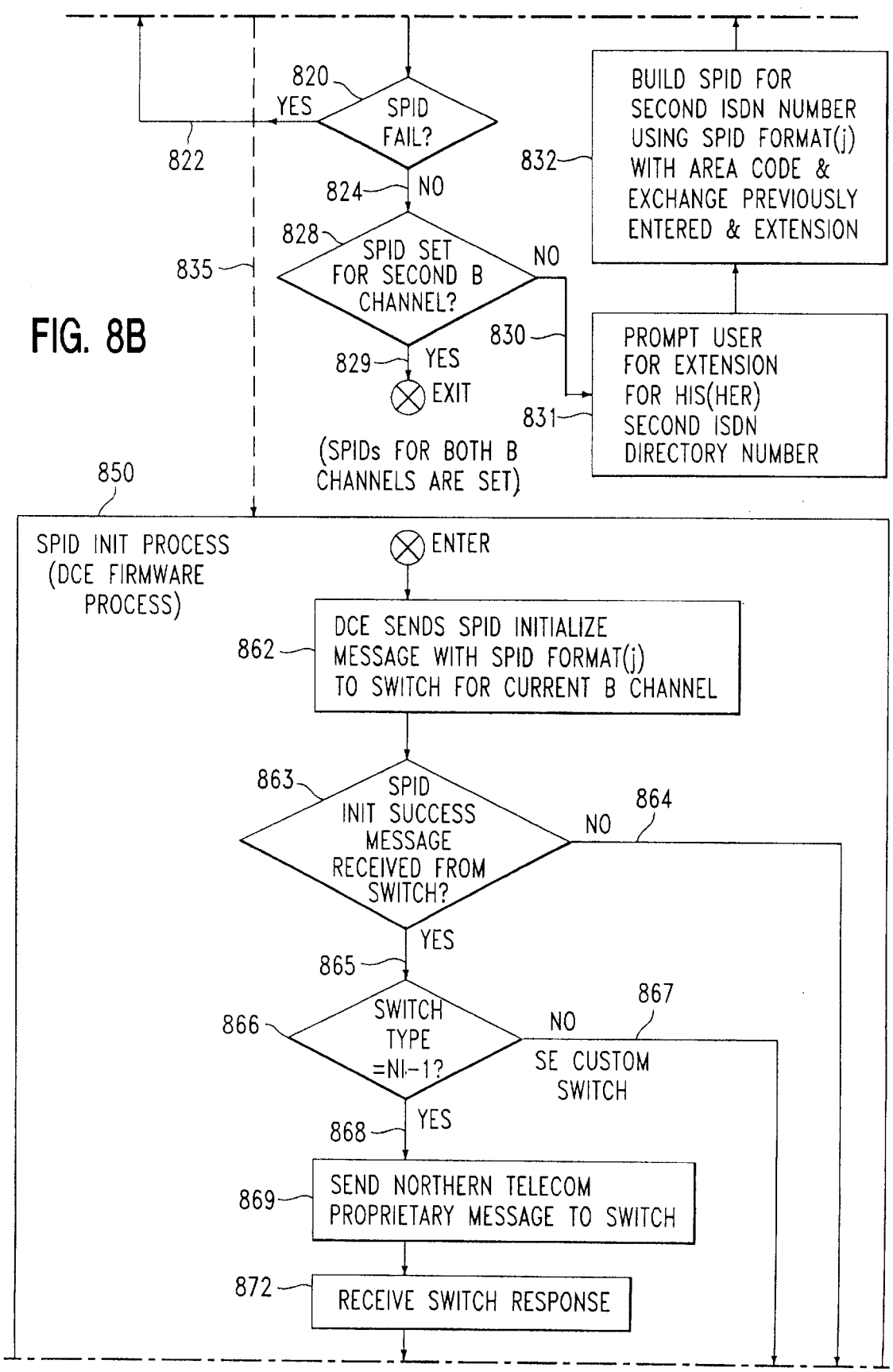

A flowchart of Automatic Switch Detection routine 700 is collectively depicted in FIGS. 7A and 7B; the correct alignment of the drawing sheets for these figures is shown in FIG. 7. Routine 700 detects the switch type, subject to further refinement during SPID formation, based on specific D-channel messages received from the ISDN switch during layer 3 initialization, i.e., initial Q.931 process 233 (see FIG. 3) negotiations. Whenever the switch type is unknown, i.e., the contents of register S50 are zero, routine 700 is automatically invoked and the Q.931 process enters a switch detection state. During this state, all incoming Q.931 messages from the switch are analyzed by routine 700. We have confirmed the correspondence between specific received Q.931 messages and individual ISDN switch types through empirical observation.

In particular, upon entry into routine 700, execution first proceeds to block 705. This block, when executed, initializes various variables used by this routine. Thereafter, execution passes to block 710 which starts a timer, illustratively and approximately 35 seconds in duration, and will wait for the next event to occur, specifically here receipt of a D-channel message from the switch. Though various blocks in this routine, as well as those for other routines and processes described hereinbelow, are event-driven, for ease of illustration, all these routines and processes are shown in flowchart form.

Decision block 715 tests for the receipt of a D-channel message. If such a message is not received, decision block 715 routes execution, via NO path 716, to decision block 720. This latter decision block determines whether the timer has expired. If not, then execution merely loops back, via NO path 724 and path 752, to decision block 715 to again test whether a D-channel message has been received. If, however, the timer has just expired, then decision block 720 routes execution, via YES path 722, to block 725. Under this time-out condition and with no D-channel message having occurred during Q.931 initialization, it is likely that the adapter is connected to a Northern Telecom custom type switch; hence, the switch type is set to a default value (Northern Telecom custom) to reflect this switch type, and register S50 is then set accordingly. Execution then exits from routine 700.

Alternatively, if a D-channel message has been received from the switch, then decision block 715 routes execution, via YES path 718, to decision block 730. This latter block tests whether the received message is an ISDN Q.931"setup" message. Based upon the kind of the message, i.e., whether this message is a specific "setup" message, or certain other specific kinds of Q.931 messages, the switch is determined to be a particular one of the three different types of 5E based ISDN switches, with register S50 set accordingly. In particular, decision block 730 tests whether the received D-channel message is a "setup" message. If the message is a "setup" message, then decision block 730 routes execution to decision block 735. This latter block tests whether a call reference field contained within this message carries a value of "0x7F" (hex) (where "x" represents a wildcard, i.e., any value). If this condition occurs, the terminal adapter is likely connected to an AT&T 5E Custom Point-to-point ISDN switch. Consequently, if this message contains this particular call reference field value, then decision block 735 routes execution, via YES path 738, to block 740. This latter block sets the switch type to reflect the AT&T 5E Custom Point-to-point switch and sets register S50 accordingly to this switch type. Thereafter, execution exits from routine 700. Alternatively, if the call reference field contains any other value than "0x7F" (hex), including zero, then execution loops back to decision block 715, via path 752 and NO path 736 emanating from decision block 735.

Now, if the received D-channel message is not a Q.931"setup" message, then decision block 730 routes execution, via NO path 734, to decision block 745. This latter block tests whether the received D-channel message is a so-called Q.931"management information message" (MIM). MIM messages are used by multi-point ISDN switches to relay information for multi-terminal communications. If this message is a MIM, then execution proceeds from decision block 745, via YES path 746, to decision block 750. This latter decision block tests the first two octets of the received MIM. If these octets carry the hex value "0x00" and "0xF7", then the adapter is likely connected to an AT&T 5E Multi-point switch. As such, decision block 750 routes execution, via YES path 754, to block 755. This latter block sets the switch type to reflect the AT&T 5E Multi-point switch and sets register S50 accordingly to this specific switch type. Thereafter, execution exits from routine 700. Alternatively, if the first two octets of the MIM contain any other hex value than "0x00" and "0xF7", then execution loops back to decision block 715, via NO path 752 emanating from decision block 750.

If the received D-channel message is not a MIM, then decision block 745 routes execution, via NO path 748, to decision block 760. This latter decision block, when executed, determines whether the received message is a Q.931"information" ("info") message. "Info" messages are used to carry so-called management information for managing multiple terminals in an ISDN connection. If the received message is an "info" message, then the adapter is likely connected to a NI-1 switch. As such, decision block 760 routes execution, via YES path 764, to block 770. At this point, an assumption is made, subject to refinement during execution of routine 800 and specifically through transmission of a Northern Telecom proprietary message (as noted above), that the NI-1 switch is an AT&T 5E NI-1 switch, rather than a Northern Telecom NI-1 switch. Accordingly, block 770 sets the switch type to reflect the AT&T 5E NI-1 switch and sets register S50 accordingly to this specific switch type. Thereafter, execution exits from routine 700. Alternatively, if the received D-channel message is not a Q.931"info" message, then execution loops back to decision block 715, via NO path 762 emanating from decision block 760.

Figure 8C:
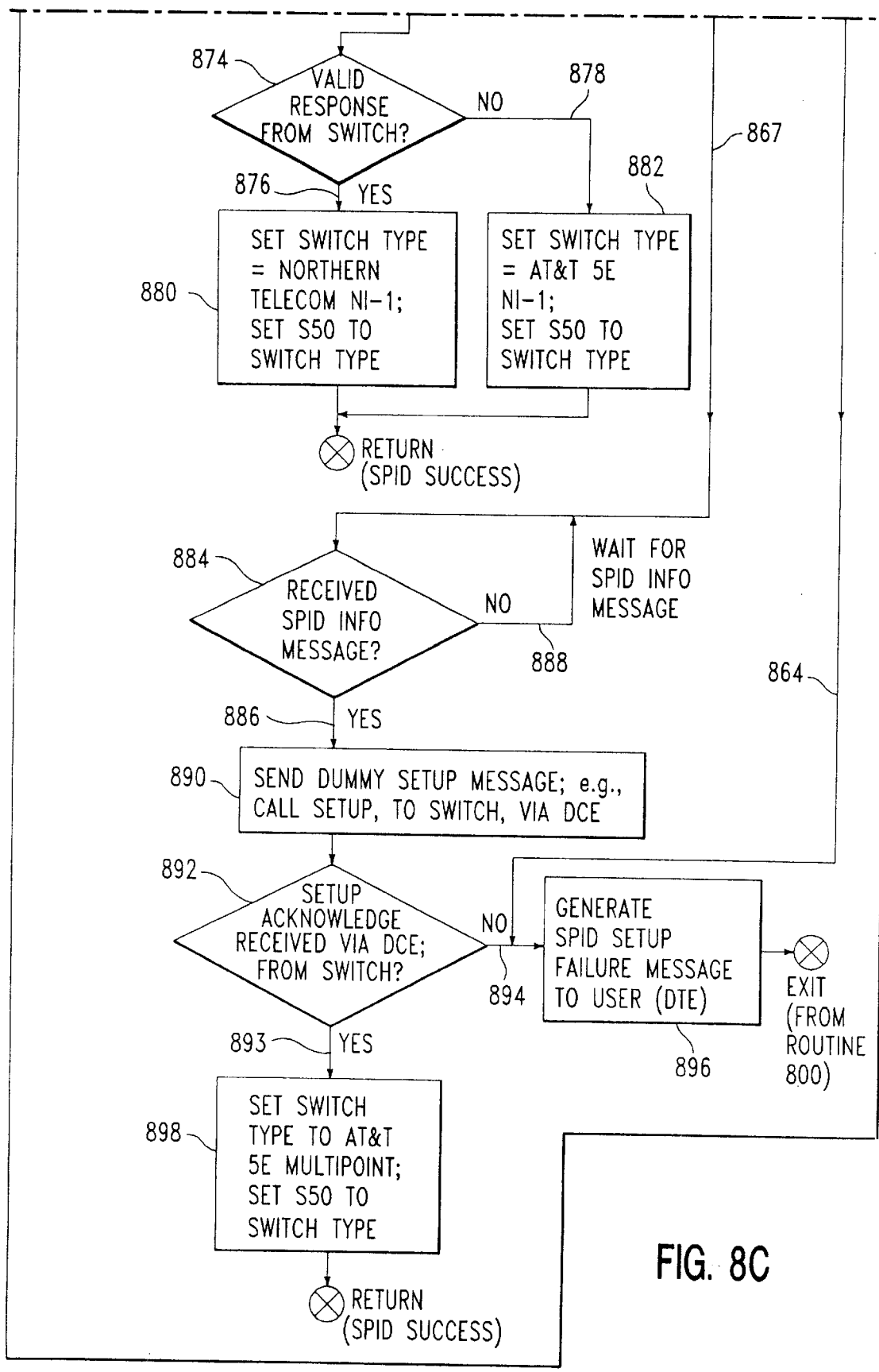

A flowchart of SPID Wizard routine 800, one portion of which executes within terminal adapter 5 and another portion of which executes within the DTE connected to the adapter, is depicted in FIGS. 8A–8C; the correct alignment of the drawing sheets for these figures is shown in FIG. 8. As noted above, routine 800 automatically determines the correct SPID format for whatever ISDN switch to which the terminal adapter is then connected and, if necessary refines and updates the detected switch type. Routine 800 is performed during initial configuration, each such reconfiguration, or upon user request. To conform FIGS. 8A–8C to FIG. 4C and facilitate reader understanding, in FIGS. 8A–8C, blocks 802–831, with exception of blocks 818 and 820, can be viewed as constituting SPID generation operations 440 shown in FIG. 4; blocks 818 and 820 can be viewed as being executed by operations 445 and 450, respectively; block 850 can be viewed as being executed by firmware execution 460; and blocks 862–898 can be viewed as constituting operations 455. With the exception of block 850 which is executed within the terminal adapter, all other operations shown in FIGS. 8A–8C are executed in the DTE (PC) specifically under program control.

Upon entry into routine 800 as shown in FIGS. 8A–8C, execution first proceeds to decision block 802. This decision block tests whether the switch type, i.e., contents of register S50, is non-zero, i.e., whether the terminal adapter has determined, subject to later refinement, the specific type of ISDN switch to which the adapter is connected. If the switch type is still zero, then SPID determination can not occur yet until such time as the switch type has been ascertained. Hence, if the switch type is zero, then, within routine 800, execution loops back to decision block 802, via NO path 804, until such time as the switch type has been determined. Once the switch type has been determined, then decision block 802 routes execution, via YES path 806, to block 808. This latter block, when executed, prompts the user to enter his (her) directory telephone number, including area code, for his (her) first ISDN number. Thereafter, block 810 executes to search SPID format database 435 (see FIG. 4C), given the area code of the first ISDN number of the user and the type of switch, as determined thus far, that is connected to the terminal adapter, to retrieve a first possible SPID format for this switch. As noted, the database will contain one and possibly more SPID formats for this area code. Once this occurs, execution proceeds to block 812, as shown in FIGS. 8A–8C, which, when executed, initializes the value of an index variable, j, to one. Execution then proceeds to block 814 which builds a SPID using the first SPID format, i.e., format (j), retrieved from the database and the ISDN telephone number, with seven or ten digits as required by that format, for the user. Thereafter, through execution of block 816, the PC sends this SPID to the DCE, i.e., the terminal adapter, using an appropriate "AT" command, which, in turn, will forward the SPID to the ISDN switch.

Once the SPID is sent to the DCE, then the PC continually polls the DCE, i.e., terminal adapter, through execution of block 818, for a response from the switch. The specific firmware which executes within the terminal adapter (DCE) to send the SPID to the switch and test the result, and, in response to this result, to refine the switch type is shown as SPID Init process 850. We will defer discussion of process 850 for the moment.

Once the PC receives a switch response from the DCE, execution proceeds to decision block 820. This block, when executed, determines, based upon the switch response, whether the SPID sent to the switch failed. If the SPID failed, then decision block 820 routes execution, via YES path 822, to block 826. This latter block increments index variable j by one to point to the next possible SPID format for the area code of the user. Execution then loops back, via path 827, to block 814 to construct a SPID with this next format, and so forth.

Alternatively, if the switch response indicates that the SPID is correct, then decision block 820 routes execution, via NO path 824, to decision block 828. This latter block, when executed ascertains whether the SPID for the second ISDN telephone number for the user has already been set. If it has, then both SPIDs for the user have been correctly determined. In this case, execution exits, via YES path 829, from routine 800. However, if only the SPID for the first ISDN telephone number has been determined, then decision block 828 routes execution, via NO path 830, to construct the SPID for the second ISDN telephone number. In particular, execution proceeds to block 831. This block, when executed, prompts the user to enter the four-digit extension for his (her) second ISDN telephone number. Though the area code and three-digit prefix are the same for two ISDN telephone numbers that collectively form a single BRI line for a subscriber, the four-digit extensions for these numbers are not necessarily consecutive. Nevertheless, the area code and prefix are displayed such that the user has the ability to change any digit therein, if need be. Once the user has completely entered the extension for the second ISDN number, then execution proceeds to block 832. Since both ISDN numbers are served by the same switch, then the SPID format for the second ISDN number will be the exact same SPID format just determined and used to construct the SPID for the first number. Consequently, there is no need to sequence through any other possible SPID formats. Accordingly, the SPID for the second ISDN number is constructed using possible SPID format (j) and the second ISDN telephone number. Execution then loops back, via path 833, to block 816 to send this SPID to the switch for testing, and so on.

Now, as to SPID Init process 850; this entire process executes within the terminal adapter to send each SPID, which was constructed in the PC, to the ISDN switch and test the result, and, if necessary, refine the switch type based upon specific ISDN messages to be sent to and then received from the switch. In particular, SPID Init process 850 occurs while the PC executes, as symbolized by dashed line 835, block 818 to poll the switch for a response.

In particular, upon entry into process 850, execution first proceeds to block 862 which sends an ISDN "SPID Init" message, containing the SPID furnished by the PC, to the switch, as an ISDN D-channel message, for a current B-channel for which the SPID is being tested. Thereafter, decision block 863 executes to route execution based upon whether the switch accepted the "SPID Init" message. In particular, decision block 863 tests whether the ISDN switch accepted the SPID sent to it by having issued an ISDN "SPID Init Success" message. If such a message was not issued, then the SPID is incorrect. Hence, firmware execution proceeds, via NO path 864 emanating from decision block 863, to block 896, with the latter, when executed, issuing an appropriate SPID failure message to the (DTE) PC. Thereafter, execution exits from process 850. Alternatively, if the SPID was successful, then decision block 863 routes execution, via YES path 865, to decision block 866. Decision block 866, when executed, determines whether the switch type is an NI-1 switch or not. As the reader will recall, both Northern Telecom and Siemens manufacture an NI-1 switch, that from the perspective of the terminal adapter, identically operates; while AT&T also manufactures an NI-1 switch, which exhibits certain idiosyncratic differences from the Northern Telecom and Siemens switches. If the switch is an NI-1 switch, then decision block 866 will route execution, via YES path 868, to blocks 869–882 in an attempt to refine the switch type between Northern Telecom (or Siemens) NI-1 or AT&T 5E NI-1 PPP. Block 869, when executed, sends a benign proprietary message, such as a "Protocol Version Control Query" message used by a Northern Telecom NI-1 switch, to the local ISDN switch. This particular message is proprietary in the sense of being unique to such Northern Telecom switches and not used in an AT&T NI-1 switch, and is benign so as not to adversely affect operation of the switch but merely provoke a response. Once such a message is sent, the response from the switch is received by the terminal adapter via execution of block 872. Once this occurs, execution proceeds to decision block 874 to test whether the switch issued a valid response to the proprietary message. If the response is valid, then the switch is a Northern Telecom (or Siemens) NI-1 switch (both the Northern Telecom and Siemens type NI-1 switches function identically from the standpoint of terminal adapter 5). In this case, execution is routed, via YES path 876 emanating from decision block 874, to block 880. This latter block sets the switch type to reflect the Northern Telecom NI-1 switch and sets register S50 accordingly to this switch type—which is the default switch type. Thereafter, execution returns from process 850 to block 818 and subsequently decision block 820. In the event the switch issued an invalid response to the proprietary message, then the switch type is an AT&T 5E NI-1 switch. Accordingly, execution is routed, via NO path 878 emanating from decision block 874, to block 882. This latter block sets the switch type to reflect the AT&T 5E NI-1 switch and sets register S50 accordingly to this switch type. Thereafter, execution returns from process 850 to block 818 and subsequently decision block 820.

If, the "SPID Init Success" message was received from the switch, however the switch type was determined to be one different from an NI-1 type switch, then execution proceeds, via NO path 867 emanating from decision block 866 within process 860, to decision block 884. In this instance, the ISDN switch may be an AT&T 5E Multi-point switch. Inasmuch as there is only one multi-point switch currently in-use, further operations are undertaken to confirm that, in fact, the terminal adapter is connected to this particular switch. Specifically, execution proceeds to decision block 884 which determines whether the switch has issued a "SPID info" (information) message. Such a message will be issued by the multi-point switch regardless of whether the SPID just supplied to the switch was successful or failed. If such a message has not occurred, then execution loops back to block 884, via NO path 888, pending receipt of this message from the switch and via the terminal adapter. Once the terminal adapter has received this message, decision block 884 routes execution, via YES path 886, to block 890. This latter block sends a so-called "dummy" setup message to provoke a benign response from this particular switch. Decision block 892 tests a response received from the switch. If a setup acknowledge message is received, then the switch type is an AT&T 5E Multi-point switch. In this case, decision block 892 routes execution, via YES path 893, to block 898. This latter block sets the switch type to reflect the AT&T 5E Multi-point switch and sets register SSC accordingly to this switch type. Thereafter, execution returns from process 850 to block 818 and subsequently decision block 820. If, however, the response is anything other than a setup acknowledge message, then the ISDN switch is not an AT&T 5E Multi-point switch and can not be ascertained among those switch types then stored in database 435. Consequently, execution proceeds, via NO path 894 emanating from decision block 892, to block 896. This latter block generates a error message to the (DTE) user, i.e., a SPID setup failure message, that signifies that a SPID can not be established for this particular switch. In this case, execution then exits from routine 800.

D. Baud Rate Unblocking

As noted previously, baud rate blocking often occurs in conventional terminal adapters previously set and locked to communicate at a fixed speed. This blocking arises because, once so set, such adapters will not autobaud to any other speed, hence frustrating and effectively blocking serial communication at such other speed between the terminal adapter, as DCE, and the PC connected thereto, as DTE. This problem is manifested whenever the adapter has its serial speed set at one speed, e.g., 230 Kbaud/second or lower, and is subsequently connected to a computer with a serial port set to a different, speed.

Advantageously our inventive terminal adapter detects instances of baud rate blocking, through excessive communication errors for a known user input, and forces the adapter to relinquish its fixed speed setting and automatically return to autobaud operation. As a result, the adapter is then able to match its serial speed with that of the PC and hence establish accurate serial communication therewith.

Figure 9:
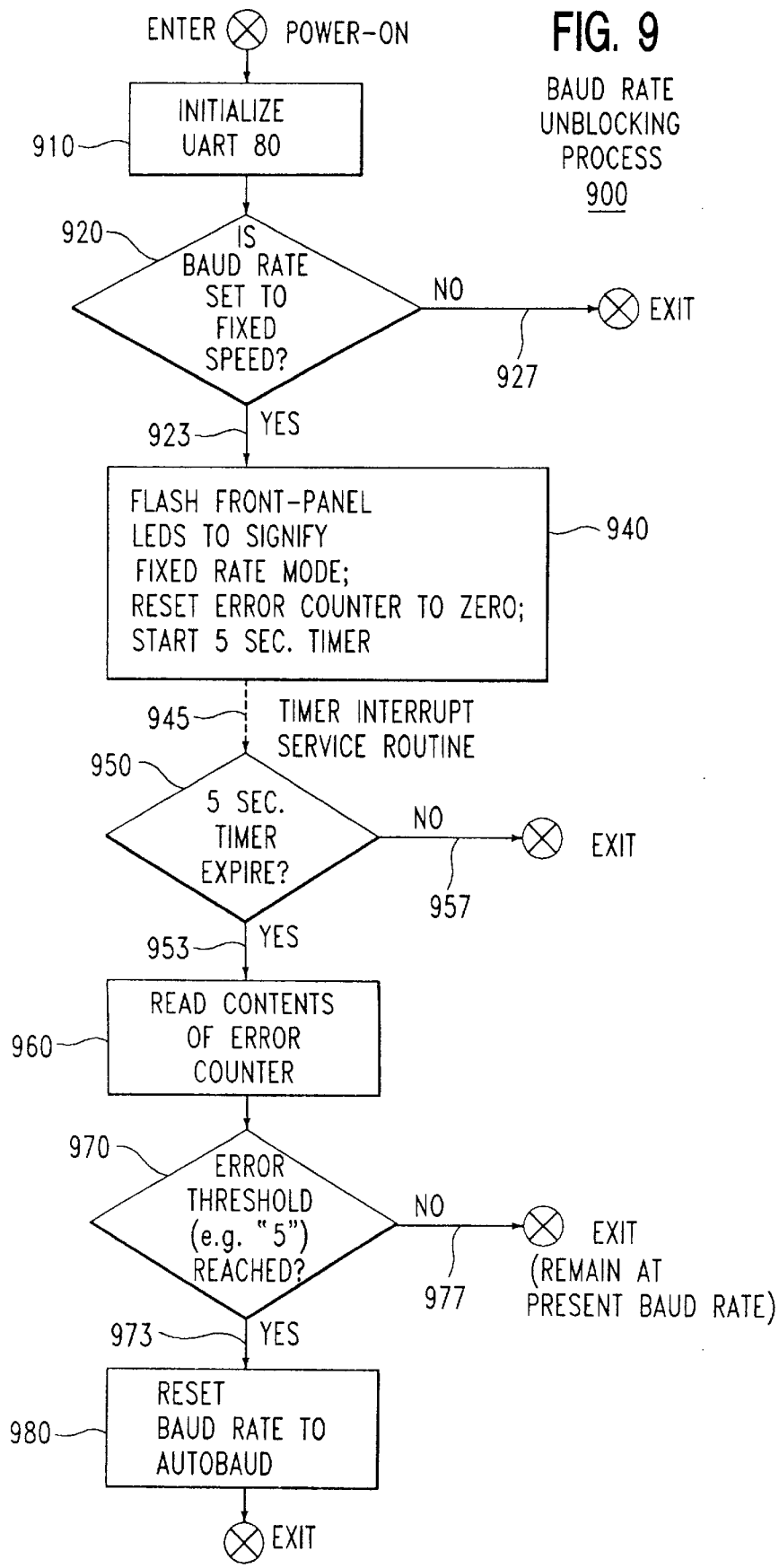
FIG. 9 depicts a flowchart of Baud Rate Unblocking process 900 that executes within terminal adapter 5.

FIG. 9 depicts a flowchart of Baud Rate Unblocking process 900 that executes within terminal adapter 5.

Upon entry into process 900, execution proceeds to decision block 910 which, when executed, resets UART 80 (see FIG. 1). Thereafter, as shown in FIG. 9, execution proceeds to decision block 920. This decision block tests whether the baud rate for the UART is currently set to a fixed speed. If the baud rate is set to an "autobaud" setting, then execution exits, via NO path 927, from routine 900.

Alternatively, if the baud rate is currently set to a fixed rate, e.g., 230 Kbaud/sec, 115 Kbaud/sec or the like, then decision block 920 routes execution, via YES path 923, to block 940. This latter block, when executed, provides a visual indication to the user in order to inform the user that the terminal adapter is currently set to a fixed rate, and provoke a pre-defined response from the user, at which baud rate blockage might occur. Specifically, block 940, when executed, flashes various indicators, typically light emitting diodes (LEDs), on a front panel of the adapter in a pre-defined pattern for a predetermined time interval to visually signify to the user that the terminal adapter baud rate is currently set to a fixed rate. Thereafter, block 940 resets an error counter to zero and starts a timer, for illustratively timing a five-second interval. The user, once he (she) sees this pattern repeatedly depresses a single key, such as, e.g., that for the letter "A", on the keyboard of the PC during approximately the next five seconds. If a baud rate blockage is now occurring, then each time the user depresses the key, an error will be generated by UART 80 owing to a clock rate difference between the speed at which the terminal adapter expects data from the serial port of the PC and a speed at which the PC is actually transmitting serial data. Though the user can depress any key repeatedly, the "A" key is preferred inasmuch as an ASCII pattern associated with the letter "A", i.e., "41" (hex), is particularly sensitive to baud rate mismatches.

During the five second interval, each communication error, resulting from here a baud rate mismatch, will generate an interrupt and be processed by UART Event Interrupt routine 1000, which will be discussed below in conjunction with FIG. 10, to accumulate all such errors that occur during this interval. When this timing interval is over, a timer interrupt will be generated and serviced by a timer interrupt service routine. This service routine will effectively direct execution, as symbolized by dashed line 945, to decision block 950. Decision block 950 determines whether the five second interval has actually expired. If this interval has not expired, then execution simply exits from routine 900, via NO path 957 emanating from decision block 950, pending the end of this interval. If, however, this interval has expired, then decision block 950 routes execution, via YES path 953, to block 960. Block 960, when executed, reads the current contents of the error counter. Thereafter, execution passes to decision block 970 to test whether the number of communication errors, that occurred during this interval, has reached (or exceeded) a predefined threshold, such as five. If the number of such errors is less than the threshold, then a baud rate blockage has not likely occurred and the serial port of the PC is likely set to that of the terminal adapter. In this case, execution merely exits, via NO path 977 emanating from decision block 970, with the terminal adapter remaining at its high speed setting. Alternatively, if the number of errors reached (or exceeded) the threshold, then a baud rate blockage has likely occurred. Hence, decision block 970 routes execution, via YES path 973, to block 980. This latter block, when executed, resets the baud rate of the terminal adapter to autobaud. Thereafter, execution exits from routine 900. With the baud rate set to autobaud, the terminal adapter can then automatically determine the baud rate to which the serial port of the PC is set and set its own baud rate to match that particular rate.

Figure 10:
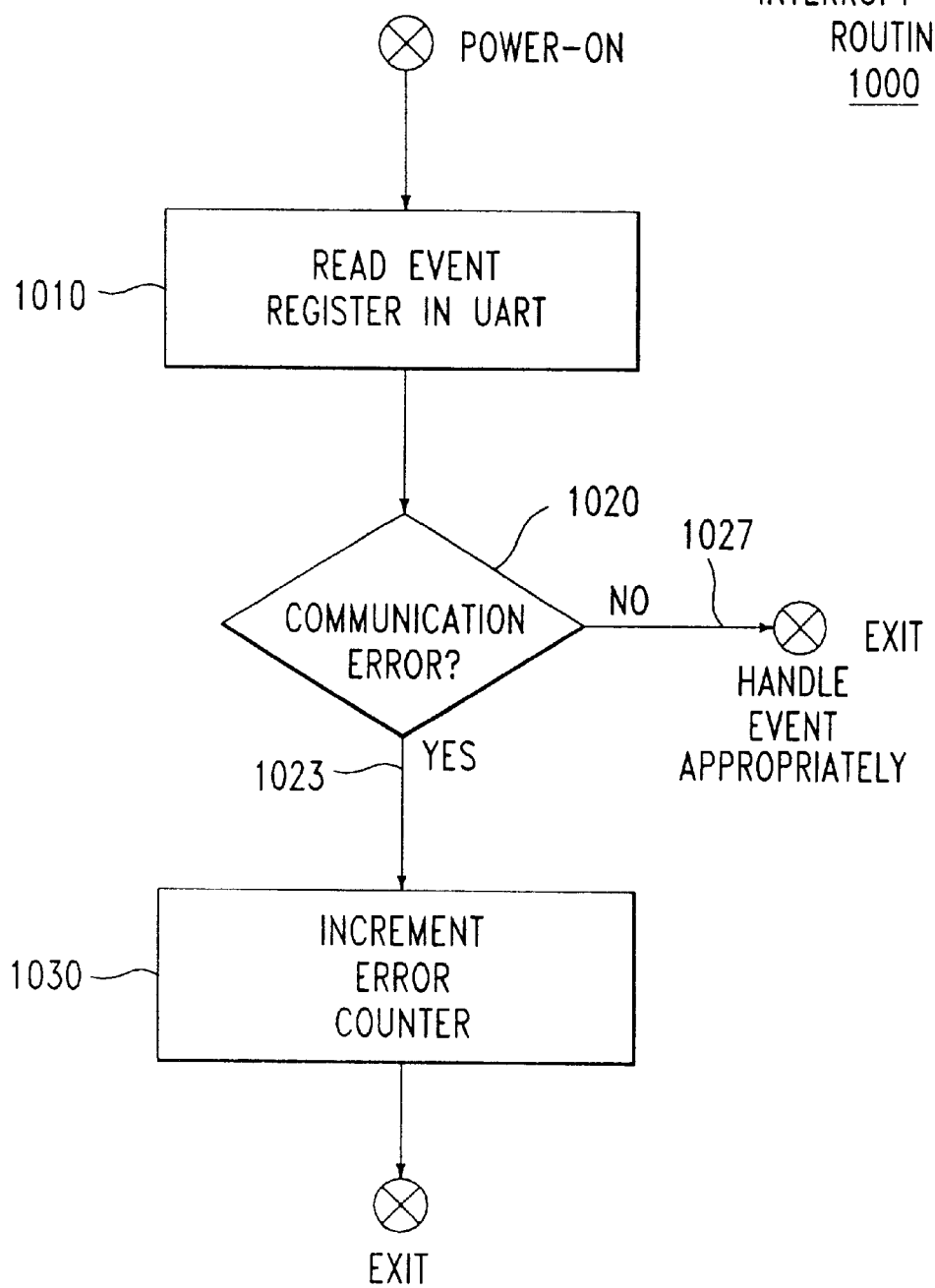
FIG. 10 depicts a flowchart of UART Event Interrupt Service routine 1000 that executes in conjunction with Baud Rate Unblocking routine 900.

FIG. 10 depicts a flowchart of UART Event Interrupt Service routine 1000. As discussed above, this routine accumulates all communication errors that occur during the illustrative five-second interval. Specifically, upon entry into routine 1000, execution proceeds to block 1010. This block, when executed reads a designation of a UART event from an event register in the UART. Thereafter, decision block 1020 tests the designation to determine whether the event was a communication error. If the event was not a communication error, then execution merely exits, via NO path 1027, from service routine 1000. Alternatively, if the event is a communication error, decision block 1020 routes execution, via YES path 1023, to block 1030. The latter block increments the contents of the error counter by one. Once this is accomplished, execution exits from service routine 1000.

E. CCP Negotiation and Automatic Data Compression

Currently, personal computer operating systems, such as the Window 95 operating system, advantageously provide the capability of compressing and decompressing outgoing and incoming serial data streams for transmission over and reception from, respectively, a serial port of the PC. However, to conventionally use this compression, not only must the PCs on both sides of a communication channel negotiate and then employ compression, but a user at each such PC must manually instruct the Window 95 operating system operating in that PC to enable compression. If compression is not so enabled at such a PC, then the operating system therein will not utilize compression. Since negotiation and subsequent use of compression is totally transparent to a user, a user may often not even realize that the operating system in his (her) PC can provide compression and whether such compression is enabled or not, and whether that user is receiving benefits, in terms of faster communication speeds and lower telecommunications charges, potentially available therethrough.

Advantageously, our inventive terminal adapter monitors negotiation over an ISDN line of the compression control protocol (CCP) occurring between the PC and its local peer, such as, e.g., a router. If the negotiations reveal that the near-end DTE, e.g., the PC, will not undertake compression, then the terminal adapter will then automatically negotiate the protocol and thereafter, for the duration of a call, perform compression and decompression in lieu of the DTE. Such intervention by the terminal adapter is substantially, if not totally, transparent to both the user and the DTE. If a similar terminal adapter is situated on the far-end of the ISDN connection, then advantageously the far-end adapter can likewise negotiate the protocol and automatically perform B-channel data compression and decompression in lieu of the far-end DTE.

Figure 11:
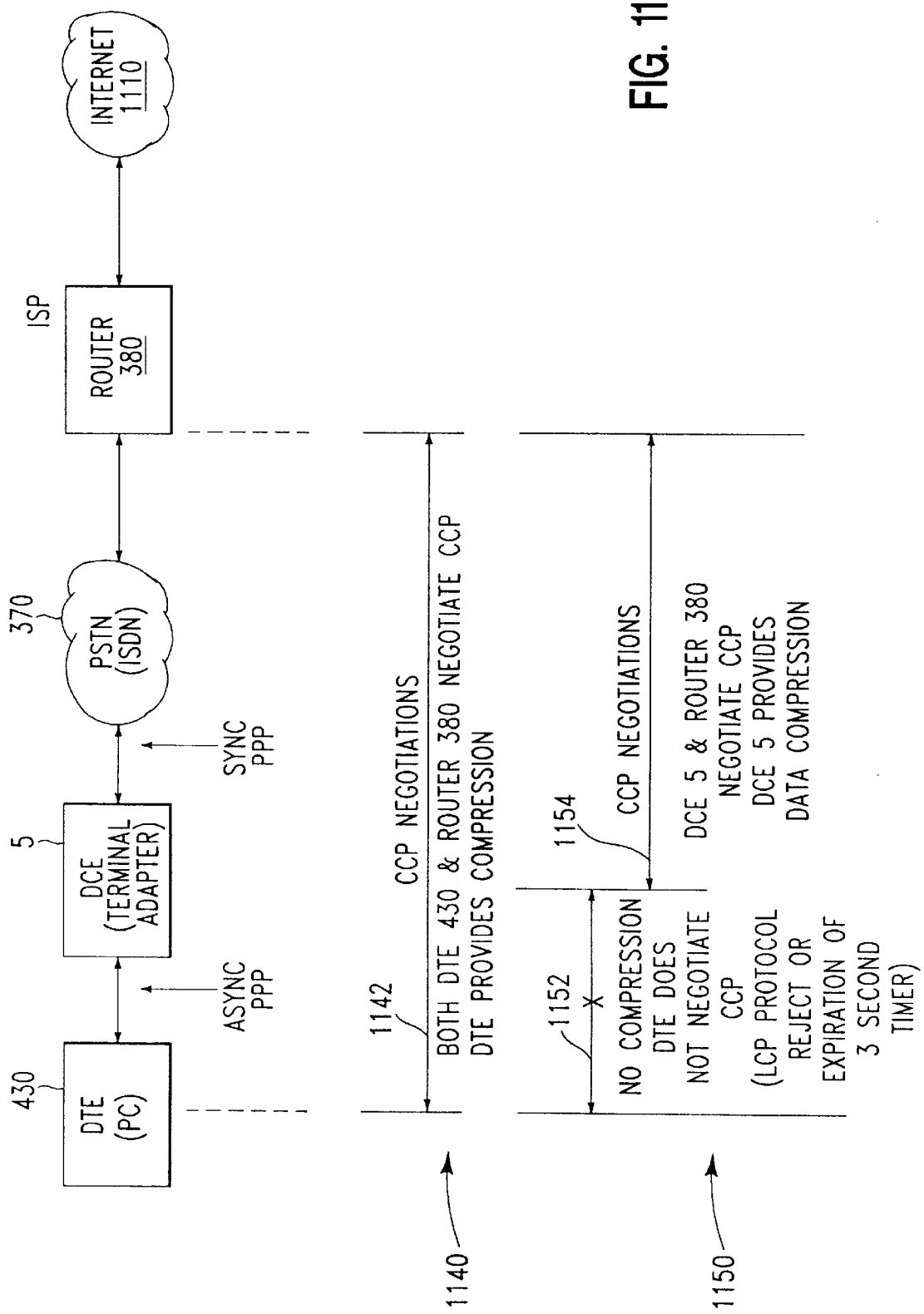
FIG. 11 depicts an illustrative connection through inventive terminal adapters 5 between its corresponding DTE (PC 430) and its PPP peer (router 380), which components thereamong negotiate a compression control protocol (CCP) so as to perform data compression.

With this in mind, to facilitate understanding, we will now describe compression-related aspects of our inventive terminal adapter in the context of the components and their network interconnection, through various ISDN links, as shown in FIG. 11, to implement a near-end portion of a typical Internet connection. As shown, DTE 430, particularly a PC, is connected to terminal adapter 5. The terminal adapter, under control of the PC, establishes an ISDN connection through public switched telephone network (PSTN) 370 to illustratively router 380 situated at an Internet service provider (ISP). The router, in turn, routes incoming TCP/IP packets (not specifically shown), originating at PC 430, over the Internet, symbolized by network 1110 to a far-end destination (not specifically shown). Communication between DTE (PC) 430 and its corresponding terminal adapter 5 are asynchronous PPP. DCE 5 converts the asynchronous PPP communication to synchronous PPP, in the manner noted above, for high-speed carriage through network 370 and Internet 1110. During the negotiations attendant to establishing the connection, both the PC and its near-end peer, i.e., router 380, will negotiate the PPP protocol which includes, as a first PPP phase, a so-called link control protocol (LCP) to establish, configure and test a data-link between the PC and the router. PPP negotiations also include negotiating a family of network control protocols (NCPs) (as a third PPP phase), of which the compression control protocol (CCP) is salient. Hence, for this overview, we will intentionally ignore all the other protocols within PPP.

With this network topology, negotiation of CCP will determine whether compression and decompression will be performed. Though the so-called conventional "Stac" compression algorithm (as noted above) is that used to actually provide B-channel data compression and decompression, the specific algorithm used is not crucial and hence will not be discussed in any further detail. All that is required is that the same algorithm be used at each end of the link, both at DTE 430 and in our inventive DCE 5 should the latter intercede in and take over CCP negotiations.

In particular, as represented by line 1142 for scenario 1140, CCP negotiations will be conducted by both the PC and its PPP peer, i.e., router 380. If, through these negotiations, both the PC and the router agree to undertake compression and decompression, then DCE 5 will not intervene in these negotiations or perform compression or decompression. Hence, DCE 5 will remain in a passive role as far as the CCP negotiations are concerned, i.e., merely passing CCP messages therethrough unchanged between the DTE 430 and the PSTN.

However, if for some reason and as represented by scenario 1150, DTE (PC) 430 refuses to undertake compression because, for example, compression has not been manually enabled through its operating system, then terminal adapter (DCE) 5 will take over (i.e., assume) the negotiations and subsequently perform compression and decompression in lieu of the DTE (here the PC)—as symbolized by line 1154. Specifically, DCE 5 will assume an active rather than passive role by interceding in and taking over on-going CCP negotiations with router 380 in an attempt to successfully negotiate compression with the router—even though such negotiations have failed, as symbolized by an "X" in line 1152, with DTE 430. Under this scenario, a CCP failure message emanating from DTE 430 will be intercepted by DCE 5 and not merely passed through this DCE to the router—as would occur in a conventional terminal adapter. If the router agrees to provide compression, then DCE 5, in lieu of DTE 430, will provide compression and decompression.

With this overview in mind, we will now turn to describing the software used within our inventive terminal adapter to provide this inventive operation. This software, which executes within the DTE, here the terminal adapter, is formed of Compression Control process 1200 and CCP Negotiation process 1300. As noted above, process 1200 is performed within AE process 260 shown in FIG. 2.

Figure 12B:
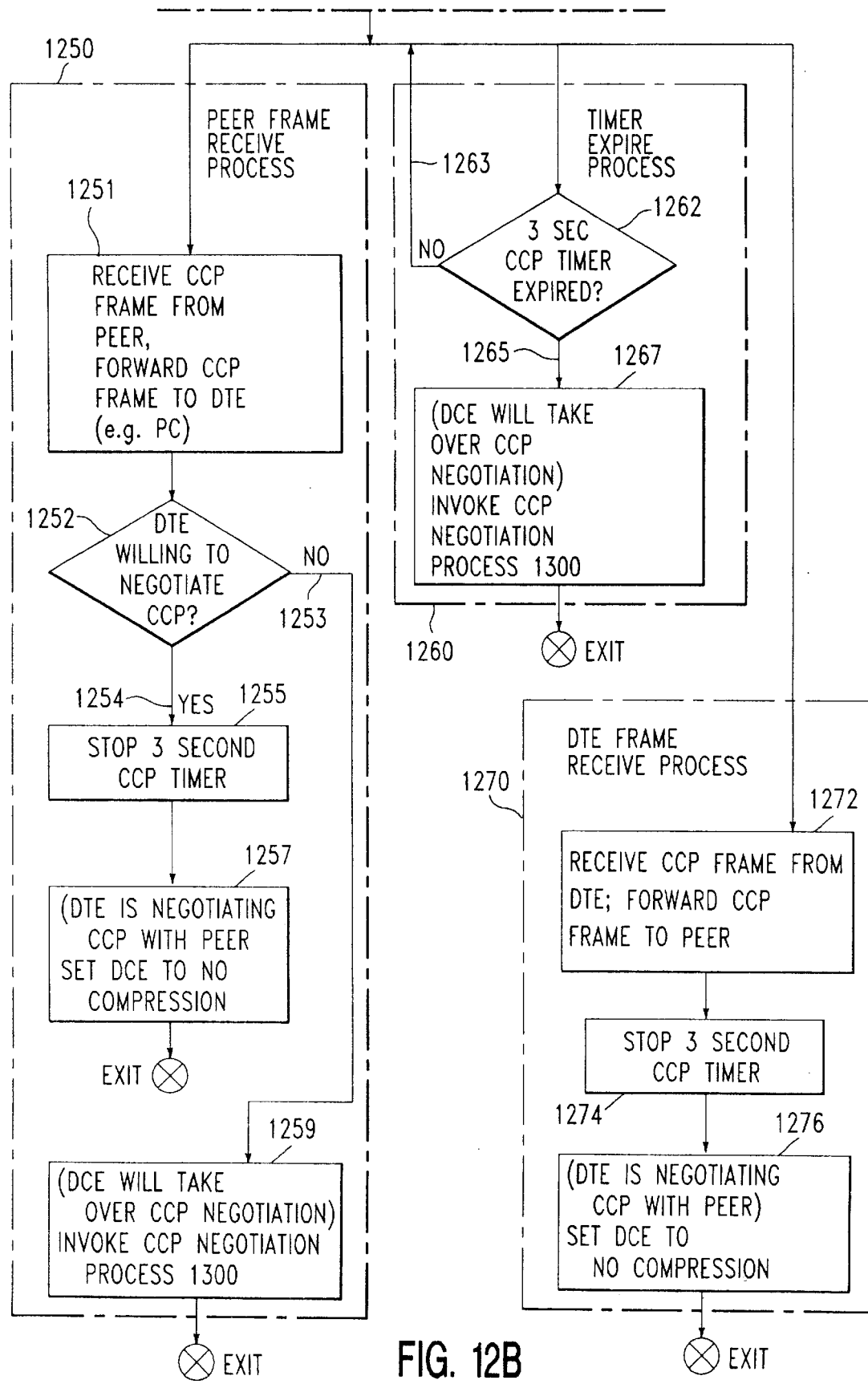

A flowchart of Compression Control Process 1200 is depicted in FIGS. 12A and 12B; the correct alignment of the drawing sheets for these figures is depicted in FIG. 12.

In particular, upon entry into routine 1200 while the terminal adapter is in an idle state, execution proceeds to block 1205 which, when executed, causes AT Command Processor 220 (see FIG. 3) to issue appropriate "AT" commands to establish an ISDN connection to a desired telephone number specified by the DTE (here the PC). Thereafter, as shown in FIGS. 12A and 12B, execution proceeds to decision block 1210. This decision block examines the serial data stream between the DTE and the terminal adapter and, from that stream, determines whether the DTE is running the PPP protocol. If not, then decision block 1210 routes execution, via NO path 1214, to block 1220. This latter block sets the protocol in use to V.120 and sets the terminal adapter (DCE) not to provide any compression. Thereafter, execution exits from process 1200.

If the DTE is running the PPP protocol, then decision block 1210 routes execution, via YES path 1212, to block 1225. This latter block monitors LCP negotiations that will then occur between the DTE (PC) and its PPP peer. Execution then proceeds to decision block 1230 to determine whether the LCP negotiations have completed. If these negotiations are still ensuing, then decision block 1230 routes execution, via NO path 1232, back to block 1225 to continue its monitoring. Alternatively, if these negotiations have concluded, then decision block 1230 routes execution, via YES path 1234, to block 1235. This latter block monitors authentication protocol negotiations that will then occur between the near-end DTE (PC) and its PPP peer. Execution then proceeds to decision block 1240 to determine whether the authentication protocol negotiations have completed. If these negotiations are still ensuing, then decision block 1240 routes execution, via NO path 1242, back to block 1235 to continue its monitoring. The LCP and authentication protocols constitute the first two phases of PPP. Alternatively, if the authentication negotiations have concluded, then decision block 1240 routes execution, via YES path 1244, to block 1245. Block 1245, when executed, monitors the NCP negotiations involving the DTE, and starts a timer, illustratively three seconds in duration. This timer will be used to define a time interval during which CCP negotiations, if they are to successfully occur involving the near-end DTE, would conclude. Thereafter, pending expiration of this three-second time interval, any of three event-driven processes: Peer Frame Receive process 1250, Timer Expire process 1260, or DTE Frame Receive process 1270 can occur. To simplify the drawing and enhance reader understanding, though, in actuality, each of these processes is event driven, execution is simply shown, in flowchart form, as passing to any of these processes from block 1245. The first of the three processes that occurs is the one that is then executed within routine 1200.

In particular, Peer Frame Receive process 1250 or DTE Frame Receive process 1270 executes upon receipt at the terminal adapter of a CCP frame either from its PPP peer or from the local DTE, i.e., the PC, respectively.

If a frame is received from the PPP peer, then process 1250 is invoked with execution first proceeding to block 1251 therein. Block 1251 obtains the CCP frame and forwards that frame to the DTE, i.e., here the PC. Thereafter, execution proceeds to decision block 1252 to test the response of the DTE to this frame. If the response indicates that the DTE (PC) is willing to negotiate the CCP, i.e., willing to undertake compression, then execution proceeds, via YES path 1254 emanating from decision block 1252, to block 1255. This latter block stops the three-second timer. Thereafter, block 1257 is executed to set the terminal adapter (DCE) not to provide any compression. Thereafter, execution exits from processes 1250 and 1200.

Alternatively, if the response from the DTE indicates that it is unwilling to negotiate CCP with its PPP peer and hence will not provide B-channel data compression, i.e., the response is, e.g., an LCP protocol reject message, then decision block 1252 routes execution, via NO path 1253, to block 1259. This latter block, when executed, instructs the DCE, i.e., here the terminal adapter, to actively take over the CCP negotiations in an attempt to provide B-channel data compression at the DCE. To do so, block 1259 invokes CCP Negotiation process 1300. Once process 1300 is invoked, execution exits from processes 1250 and 1200.

Now, if a frame is received from the DTE, i.e., here the PC, then process 1270 is invoked with execution first proceeding to block 1272 therein. Block 1272 obtains the CCP frame from the PC and forwards that frame to the PPP peer. This frame indicates that the DTE, i.e., here the PC, will negotiate CCP and provide B-channel compression and decompression. Hence, execution then proceeds to block 1274 to stop the three-second timer. Thereafter, block 1276 is executed, to set the terminal adapter (DCE) not to provide any compression. Thereafter, execution exits from processes 1250 and 1200.

If an interrupt is received indicating that the three-second timer has expired, then Timer Expire process 1260 is invoked. If this timer does expire, then an assumption is made that the DTE (i.e., the PC) is unwilling to negotiate CCP and provide compression and decompression; hence, the DCE (terminal adapter) will attempt to do so. Specifically, upon entry into this process, execution proceeds to decision block 1262 to test whether the timer actually did expire. If, in fact, the timer has not expired, then decision block 1262 routes execution, via NO path 1263, back to an entry point of processes 1250, 1260 and 1270 pending occurrence of a next event. Alternatively, if the three-second timer has expired, then decision block 1262 routes execution, via YES path 1265, to block 1267. This latter block, when executed, instructs the DCE, i.e., here the terminal adapter, to actively take over the CCP negotiations in an attempt to provide B-channel data compression at the DCE. To do so, block 1267 invokes CCP Negotiation process 1300. Once process 1300 is invoked, execution exits from processes 1260 and 1200.

FIG. 13 depicts a flowchart of CCP Negotiation process 1300. This process handles CCP negotiations and, based on the outcome of these negotiations, instructs the DCE (here the terminal adapter) to accordingly provide B-channel data compression (and decompression) or not.

Specifically, upon entry into process, execution first proceeds to block 1310. This block, when executed, initializes contents of a retry counter to zero. Thereafter, execution proceeds to block 1320 which, when executed, negotiates CCP with a PPP peer. This peer can be whatever device is connected to and able to negotiate CCP with the terminal adapter. Thereafter, decision block 1330 executes to determine whether CCP was successfully negotiated with that peer, i.e., whether that peer has agreed to employ compression (and decompression) at its end. If the negotiations were successful, then decision block 1330 routes execution, via YES path 1333, to block 1340. This latter block, when executed, enables data compression in the terminal adapter (DCE). Thereafter, execution exits from process 1300. Alternatively, if CCP could not be negotiated with the PPP peer, then these negotiations are successively re-attempted ("retried") a given number of times in an effort to obtain a successful result or an LCP protocol reject message from the peer. In particular, if decision block 1330 concludes that, as a result of an attempt at CCP negotiations, CCP could not then be negotiated with the peer, execution is routed, via NO path 1337, to decision block 1350. This latter block ascertains whether the number of times these negotiations have been re-attempted, i.e., the contents of the retry counter, has reached a predefined limit, i.e., a "retry count", which is illustratively set to ten; or whether an LCP protocol reject message has been received—the latter indicating that the PPP peer is unwilling, for whatever reason, to both negotiate CCP and thereby provide compression. If this limit has not been reached and an LCP protocol reject message has not been received, then decision block 1350 routes execution, via NO path 1353, to block 1360. This latter block increments the contents of the retry counter by one. Thereafter, execution loops back to block 1320 for the next attempt at CCP negotiations, and so forth. Alternatively, if the limit has been reached or an LCP protocol reject message has been received, as a result of an attempt at CCP negotiations— either case signifying that CCP negotiations with the PPP peer have failed, then decision block 1350 routes execution, via YES path 1357, to block 1370. This latter block, when executed, disables B-channel data compression in the DCE (terminal adapter). Thereafter, execution exits from process 1300.

Those skilled in the art will clearly realize that although we described our present invention in terms of use with DTE and DCE suited for use with, e.g., an ISDN connection, several aspects of our invention are not so limited.

For example, our inventive methodology for baud rate unblocking is suitable for use in nearly any serial communications device that communicates with a receiving device wherein each of these devices can be set to different fixed serial speeds and the former device can provide "autobaud" operation. Generally, this methodology will find its main, though not exclusive, applicability with serial communication between a serial port of a PC, which only operates at a user-selectable fixed baud rate, and a modem or terminal adapter, that provides both fixed baud rate and autobaud operation, to break a baud rate blockage therebetween.

In addition, our inventive methodology for controlling the use of compression is suitable for use in conjunction with substantially any interface device that connects to any data transmitting device wherein the latter relies on negotiating a protocol, such as for example CCP, over a communication channel with a far-end device to control the use of end-to-end data compression over that channel. In use, our methodology would intercept and take over protocol negotiations with the far-end device to provide compression in the event the data transmitting device, for whatever reason, refuses or is unable to do so. This methodology is clearly not limited to ISDN communication but can be used over any type of communication channel to advantageously reduce transmission time and, where applicable, communication cost.

Moreover, although SPID format database 435 has been described as being supplied to and accessed by DTE 430, specifically the PC, during configuration, this database would alternatively be stored within memory 10 within the terminal adapter (DCE). In this case, the adapter itself, rather than in conjunction with the DTE, would determine the switch type. In particular, CPU 40 within the adapter, rather than the PC, would in response to a user or otherwise supplied directory telephone number, access the SPID format database and construct the ISDN SPID which, in turn, will be applied by the adapter to the ISDN switch to provoke, in the same fashion as described above, a response thereto so as to ascertain and, where necessary, refine the switch type. This approach may be particularly useful when the terminal adapter is connected to a device, such as other than a general purpose computer, "PC", that is not user programmable.

Although a single embodiment which incorporates the teachings of the present invention has been shown and described in detail herein, those skilled in the art can readily devise many other embodiments that still utilize these teachings.

We claim:

1. A method for preventing baud rate blockage from occurring between first and second communicating devices, said first and second devices communicating with each other via a serial connection extending therebetween, the first and second devices being data circuit terminating equipment (DCE) and data terminal equipment (DTE), respectively, the DCE being capable of establishing communication through a communication link, separate from the serial connection, with a DCE peer device, wherein the DCE provides either said fixed baud rate operation or autobaud operation and the DTE provides fixed baud rate operation, the method comprising the steps of, in the DCE:

detecting whether the DCE is set to said fixed baud rate operation;

if the DCE is set to said fixed baud rate operation, providing an indication signifying said fixed baud rate operation so as to obtain, via the serial connection, entries from the DTE of at least one pre-defined data value occurring over a pre-defined interval of time;

obtaining said entries, in response to the indication, from the DTE and communicated over the serial connection;

detecting, in response to said entries communicated by the DTE to the DCE, communication errors arising from a baud rate mismatch between the DCE and the DTE; and in the event a totalized number of said communication errors occurring during said interval exceeds a pre-defined threshold, changing operation of the DCE from the fixed baud rate operation to the autobaud operation whereby the DCE can detect a fixed baud rate then being used by the DTE for communication over the serial connection and set its own baud rate for communication over said connection to match that of the DTE so as to prevent said baud rate blockage from occurring between the DTE and DCE for communication over the serial connection therebetween.

2. Apparatus for preventing baud rate blockage from occurring between first and second communicating devices, said first and second devices communicating with each other via a serial connection extending therebetween, the first and second devices being data circuit terminating equipment (DCE) and data terminal equipment (DTE), respectively, the DCE being capable of establishing communication through a communication link, separate from the serial connection, with a DCE peer device, wherein the DCE provides either said fixed baud rate operation or autobaud operation and the DTE provides fixed baud rate operation, the apparatus comprising, in the DCE:

a first processor;

a first memory for storing first executable instructions therein; and serial communications circuitry, connected to the processor, for interfacing to said serial connection; and wherein the processor, in response to the stored first instructions:

detects whether the DCE is set to said fixed baud rate operation;

if the DCE is set to said fixed baud rate operation, provides an indication signifying said fixed baud rate operation so as to obtain, via the serial connection, entries from the DTE of at least one pre-defined data value occurring over a pre-defined interval of time;

obtains said entries, in response to the indication, from the DTE and communicated over the serial connection;

detects, in response to said entries communicated by the DTE to the DCE, communication errors arising from a baud rate mismatch between the DCE and the DTE; and in the event a totalized number of said communication errors occurring during said interval exceeds a pre-defined threshold, changes operation of the DCE from the fixed baud rate operation to the autobaud operation whereby the DCE can detect a fixed baud rate then being used by the DTE for communication over the serial connection and set its own baud rate for communication over said connection to match that of the DTE so as to prevent said baud rate blockage from occurring between the DTE and DCE for communication over the serial connection therebetween.

3. The method in claim 1 wherein the indication providing step comprises the step of providing a predefined visual indication at the DCE.

4. The method in claim 3 wherein the method further comprises the steps, occurring at the DTE, of:

repetitively depressing, in response to the indication, a key on a keyboard associated with the DTE during the predefined interval of time so as to generate, within the DTE, a stream of identical predefined serial data values as said entries; and transmitting said entries over the serial connection to the DCE.

5. The method in claim 4 wherein the DCE comprises a terminal adapter or a modem.

6. The method in claim 5 wherein the predefined data value is an ASCII pattern associated with said key.

7. The method in claim 6 wherein the predefined interval is at least five seconds and the predefined threshold is at least five.

8. The method in claim 7 wherein the key is the letter "A" and the predefined data value is the hex value 41.

9. The method in claim 5 wherein the DTE comprises a computer.

10. The method in claim 9 wherein the predefined data value is an ASCII pattern associated with said key.

11. The method in claim 10 wherein the predefined interval is at least five seconds and the predefined threshold is at least five.

12. The method in claim 11 wherein the key is the letter "A" and the predefined data value is the hex value 41.

13. The apparatus in claim 2 wherein the first processor, in response to the first executable instructions and if the DCE is set to the fixed baud rate operation, provides a predefined visual indication thereof at the DCE.

14. The apparatus in claim 13 wherein the DTE comprises a second processor, a second memory for storing second executable instructions therein, and a keyboard, and the second processor, in response to the second executable instructions stored in the second memory:

generates a stream of identical predefined serial data values as said entries in response to repetitive user depressions of a key on the keyboard during the predefined interval of time; and transmits said entries over the serial connection to the DTE.

15. The apparatus in claim 14 wherein the DCE comprises a terminal adapter or a modem.

16. The apparatus in claim 15 wherein the DCE comprises an ISDN terminal adapter having:

first and second independent B-channel hardware data link controller (HDLCs);

an ISDN line interface for interfacing two separate corresponding B channels in a 2B+D ISDN line to said first and second B-channel controllers, and, D-channel signaling, to the processor; and connections, established by the first processor through execution of said first executable instructions, between an individual one of said B-channel HDLCs and either said first or second B-channels in said ISDN line.

17. The apparatus in claim 15 wherein the predefined data value is an ASCII pattern associated with said key.

18. The apparatus in claim 17 wherein the predefined interval is at least five seconds and the predefined threshold is at least five.

19. The apparatus in claim 18 wherein the DCE comprises an ISDN terminal adapter having:
   first and second independent B-channel hardware data link controllers (HDLCs);
   an ISDN line interface for interfacing two separate corresponding B channels in a 2B+D ISDN line to said first and second B-channel controllers, and, D-channel signaling, to the processor; and
   connections, established by the first processor through execution of said first executable instructions, between an individual one of said B-channel HDLCs and either said first or second B-channels in said ISDN line.

20. The apparatus in claim 19 wherein the key is the letter "A" and the predefined data value is the hex value 41.

21. The apparatus in claim 15 wherein the DTE comprises a computer.

22. The apparatus in claim 21 wherein the predefined data value is an ASCII pattern associated with said key.

23. The apparatus in claim 22 wherein the predefined interval is at least five seconds and the predefined threshold is at least five.

24. The apparatus in claim 23 wherein the DCE comprises an ISDN terminal adapter having:
   first and second independent B-channel hardware data link controllers (HDLCs);
   an ISDN line interface for interfacing two separate corresponding B channels in a 2B+D ISDN line to said first and second B-channel controllers, and, D-channel signaling, to the processor; and
   connections, established by the first processor through execution of said first executable instructions, between an individual one of said B-channel HDLCs and either said first or second B-channels in said ISDN line.

25. The apparatus in claim 24 wherein the key is the letter "A" and the predefined data value is the hex value 41.

* * * * *